United States Patent
Poulin

(10) Patent No.: US 8,332,203 B1
(45) Date of Patent: *Dec. 11, 2012

(54) SYSTEM AND METHODS FOR AUTHORING A MOBILE DEVICE APPLICATION

(75) Inventor: Donavan Paul Poulin, Kelowna (CA)

(73) Assignee: Wapp Tech Corp., Red Deer (CA)

( * ) Notice: Subject to any disclaimer, the term of this patent is extended or adjusted under 35 U.S.C. 154(b) by 230 days.

This patent is subject to a terminal disclaimer.

(21) Appl. No.: 12/759,543

(22) Filed: Apr. 13, 2010

Related U.S. Application Data

(63) Continuation of application No. 11/449,958, filed on Jun. 9, 2006, now Pat. No. 7,813,910.

(60) Provisional application No. 60/689,101, filed on Jun. 10, 2005.

(51) Int. Cl.
*G06F 9/455* (2006.01)
*G06F 3/13* (2006.01)

(52) U.S. Cl. ............... 703/22; 703/13; 703/24; 703/27; 709/206; 709/246; 715/771

(58) Field of Classification Search ............... 703/13, 703/24, 27; 709/206, 246; 715/771
See application file for complete search history.

(56) References Cited

U.S. PATENT DOCUMENTS

| | | | | | |
|---|---|---|---|---|---|
| 5,892,794 | A | * | 4/1999 | Slegers | 375/219 |
| 5,937,421 | A | * | 8/1999 | Petrov et al. | 715/205 |
| 7,107,049 | B2 | | 9/2006 | Barberis et al. | |
| 7,313,772 | B2 | * | 12/2007 | Hekmatpour et al. | 716/106 |
| 7,546,298 | B2 | | 6/2009 | Hulaj et al. | |
| 7,813,910 | B1 | * | 10/2010 | Poulin | 703/22 |
| 2002/0188713 | A1 | | 12/2002 | Bloch et al. | |
| 2004/0039975 | A1 | * | 2/2004 | Kounik et al. | 714/741 |
| 2006/0036941 | A1 | | 2/2006 | Neil | |
| 2007/0005324 | A1 | * | 1/2007 | Gong et al. | 703/14 |
| 2007/0019769 | A1 | * | 1/2007 | Green et al. | 375/360 |
| 2007/0127426 | A1 | * | 6/2007 | Watters et al. | 370/338 |
| 2007/0142091 | A1 | * | 6/2007 | Gasborro et al. | 455/566 |
| 2007/0174490 | A1 | * | 7/2007 | Choi et al. | 709/246 |
| 2007/0288424 | A1 | * | 12/2007 | Neil | 707/2 |
| 2008/0313282 | A1 | * | 12/2008 | Warila et al. | 709/206 |
| 2010/0017185 | A1 | | 1/2010 | Bade et al. | |

OTHER PUBLICATIONS

Macromedia® Flash MX 2004 Professional Flash Lite User Manual, Second Edition, Aug. 2003, 22 pages.
Macromedia® Flash 8, Developing Flash Lite Application, First Edition, Sep. 2005, 94 pages.
Macromedia® Flash MX Professional 2004, Flash Lite Authoring Guidelines for the i-mode Service by NTT DoCoMo, First Edition: Mar. 2003, 48 pages.
FlashCast Add-in for Flash MX Professional 2004, Adobe®, 2009, 3 pages.
Macromedia® FlashCast™ FAQ, 2006, 4 pages.
Adobe®, TechNote, Unable to use a handset emulator to test Flash Lite content, Feb. 28, 2005, 1 page.

(Continued)

*Primary Examiner* — Thai Phan

(57) ABSTRACT

A system and methods emulate an application executing in real time in a mobile device. The mobile device is emulated in real time using a model running on a processor extrinsic to the mobile device. The model is based on characteristics indicative of performance of the mobile device. The application is executed in real time within the model and the application executing in the model is monitored to determine resource utilization information by the application for the mobile device. The resource utilization information for the mobile device is displayed.

33 Claims, 14 Drawing Sheets

OTHER PUBLICATIONS

Talbot, J., Creating Flash Lite Applications, Adobe®, 2006, 38 pages.
Adobe—Developer Center: MAX Sneak Peeks, MAX 2005 Articles, Oct. 2005, 12 pages.
Case No. CV 08-4166 JL, ThinkVillage-Kiwi LLC'S Complaint and Demand For Jury Trial, Sep. 1, 2008, 12 pages.
Case No. CV 08-4166 JL, Answer of Defendants Adobe Systems, Inc. And Adobe Macromedia Software LLC to ThinkVillage-Kiwi LLC'S Complaint; Sep. 24,2008; 8 pages.
Case No. CV 08-4166 SI, Supplemental Declaration of Jakub Plichta in Support of Motion by Defendants for Summary Judgment, dated Oct. 16, 2009, 2 pages.
Campbell, R.; Adobe Systems Incorporated; letter to Dr. T.W. Stevenson dated Jan. 14, 2005; 2 pages.
Nokia, Release Note for Nokia's "Series 60 $2^{nd}$ Edition SDK for Symbian OS Supporting Feature Pack 3" dated Jun. 17, 2005—Exh. A to Case No. CV 08-4166 SI, Supplemental Declaration of Jakub Plichta in Support of Motion by Defendants for Summary Judgment dated Oct. 16, 2009, 5 pages.
Nokia, selected pages from User Manual—Series 60 $2^{nd}$ Edition SDK for Symbian OS, Supporting Feature Pack 3—Exh. B to Case No. CV 08-41166 SI, Supplemental Declaration of Jakub Plichta in Support of Motion by Defendants for Summary Judgment dated Oct. 16, 2009, 7 pages.
U.S. Appl. No. 11/449,958, Office Action mailed Jun. 1, 2009, 10 pages.
U.S. Appl. No. 11/449,958, Response to Office Action filed Jul. 17, 2009, 24 pages.
U.S. Appl. No. 11/449,958, Office Action mailed Nov. 17, 2009, 11 pages.
U.S. Appl. No. 11/449,958, Response to Office Action filed Nov. 19, 2009, 12 pages.
U.S. Appl. No. 11/449,958, Office Action mailed Dec. 3, 2009, 11 pages.
U.S. Appl. No. 11/449,958, Pre-Brief Appeal Conference Request filed Dec. 7, 2009, 6 pages.
U.S. Appl. No. 11/449,958, Pre-Brief Appeal Conference Decision mailed Feb. 9, 2010, 2 pages.
U.S. Appl. No. 11/449,958, Office Action mailed Apr. 19, 2010, 11 pages.
U.S. Appl. No. 11/449,958, Applicant Interview Request filed Apr. 22, 2010, 2 pages.
U.S. Appl. No. 11/449,958, Applicant Interview Summary filed May 6, 2010, 10 pages.
U.S. Appl. No. 11/449,958, Examiner Interview Summary mailed May 11, 2010, 4 pages.
U.S. Appl. No. 11/449,958, Examiner Interview Summary mailed May 24, 2010, 4 pages.
U.S. Appl. No. 11/449,958, Applicant Interview Summary filed Jun. 10, 2010, 3 pages.
U.S. Appl. No. 11/449,958, Examiner Interview Summary mailed Jun. 15, 2010, 4 pages.
U.S. Appl. No. 11/449,958, Amendment and Response to Examiner Interview Summary filed Jun. 15, 2010, 8 pages.
Compuware, "Windows CE Development, Testing and Tuning", Compuware NuMega, date unknown.
De Herrera, , "Windows Mobile 5.0 Emulator", 2005.
Harrison, et al., "Appendix 4: Emulator Reference", Symbian OS for Mobile Phones, 2003.
Kane Computing, LTD, "Code Composer Studio Development Tools v3.1", Getting Started Guide, Texas Instruments, May 2005.
Knudsen, "New Features in the J2ME Wireless Toolkit 1.0.4", Jun. 2002.
Knudsen, et al., "New Features in the J2ME Wireless Toolkit 1.0.4", http://developers.sun.com, Jun. 2002.
Li, et al., "Beginning J2ME: From Novice to Professional", 3rd Edition.
Maas, , "Using Palm OS Emulator", www.palmos.com/dev/support/docs/, Mar. 2002.
Morrison, "Wireless Java with J2ME", InformIT, Jun. 17, 2001, 576.
Morrison, Michael "Getting to Know the J2ME Emulator", J2ME Emulator Essentials, Aug. 17, 2001.
Motorola, "iDEN Development and Runtime Utilities", Motorola, 2005.
Nokia, "Series 60 Developer Platform: Debugging Software with Borland C++ BuilderX", Forum Nokia; Version 1.0, Jan. 12, 2004.
Openwave, "Getting Started", Openwave Systems, Inc, Jun. 2002.
Research in Motion LTD, "BlackBerry Java Development Environment", Developer Guide vol. 1, Version 3.6, 2003.
Research in Motion LTD, "BlackBerry Simulator", User Guide, Version 3.6, Apr. 10, 2003.
Satoh, "A Testing Framework for Mobile Computing Software", IEEE Computer Society, IEEE Transactions on Software Engineering; vol. 29 No. 12, Dec. 2003.
Stevenson, "Code Composer Studio IDE v3 White Paper", Jul. 2004.
Sun Java System, "J2EE 1.4 Platform", NetBeans, May 2005.
Sun Microsystems, "J2ME Wireless Toolkit", User's Guide, Version 2.2, Oct. 2004.
Sun Microsystems, "White Paper on KVM and the Connected, Limited Device Configuration (CLDC)", J2ME Building Blocks for Mobile Devices, May 19, 2000.
Symbian, "EPOC Emulator", 1997.
Taylor, Michael "J2ME IDE Comparison", Development Consulting Limited Version 1.1, Jun. 29, 2002.
Texas Instruments, "Code Composer Studio v3.0", Getting Started Guide, Sep. 2004.
Texas Instruments, "Code Composer Studio v5", Texas Instruments Embedded Processors Wiki, 2004.
Yuan, "Developing J2ME Applications with EclipseME", IBM, Nov. 30, 2004.

* cited by examiner

SYSTEM AND METHODS FOR AUTHORING A MOBILE DEVICE APPLICATION

RELATED APPLICATIONS

This application is a continuation of U.S. patent application Ser. No. 11/449,958, filed Jun. 9, 2006 now U.S. Pat. No. 7,813,910, which claims priority to U.S. Patent Application Ser. No. 60/689,101 filed Jun. 10, 2005. Both of the aforementioned applications are incorporated herein by reference.

BACKGROUND

It is estimated that the mobile market is evolving at five times the speed of the eCommerce market. It is estimated that nearly 700 million new mobile devices will be shipped in 2005, with a new handset model being launched every other day. This rapid mobile device development requires that applications designed to run on these mobile devices also sustain rapid development. Development systems targeted at one mobile device may become obsolete and possibly of little value to the developer at the time it is shipped as well as development life cycles.

Many new mobile devices include a display management engine called a Flash Player; one example of a Flash Player suitable for mobile devices is FlashLite, developed by Macromedia. The Flash Player provides a common application platform for playing applications on the mobile devices and allows developers to develop applications that may be played on multiple mobile devices that include the Flash Player. Applications for mobile devices are typically developed on a personal computer (PC) or workstation and target one or more types of mobile device that include a Flash Player. These applications require real-time testing of the application on all applicable mobile devices. Although a Flash Player application may operate correctly on one mobile device model, it may crash when playing on a different mobile device model. For example, a NOKIA 6600 has a 16% reduction in ARM CPU speed and available memory resources compared to a NOKIA 7610, thus an application that plays correctly on the NOKIA 7610 may not play correctly on the NOKIA 6600 due to this drop in inherent resources.

Development packages (e.g., FlashMX by Macromedia) are available to run on a PC and allow development of Flash Player applications for one or more mobile devices. However, although these development packages may simulate operation of the application playing on the targeted mobile device, they do not determine if the application will play correctly on the targeted mobile device based upon resource usage. Currently, the only way to determine if an application plays on a particular mobile device is to transfer the application to the device and play it. During development of an application for a mobile device, an application author may transfer and play the application hundreds of times (development life cycles) on the targeted mobile device before identifying and correcting all system resource problems within the application. Where an application is targeted to play on many types of mobile device, it must be transferred and tested on a mobile device representative of each targeted mobile device type. This transferring and testing process is time-consuming and therefore costly for the application author.

Further, having accessibility to all available mobile devices in targeted geographical markets worldwide as well as real-time interaction with network Operators to measure and emulate network characteristics within each market is presently not possible.

SUMMARY OF THE INVENTION

In one embodiment, a method emulates and profiles an application to play on a mobile device that includes a Flash Player. Characteristics defining performance of the mobile device are loaded. The mobile device is emulated using a model based upon the characteristics. The application is played and monitored within the model to determine resource utilization of the application for the mobile device.

In another embodiment, a method authors, emulates and profiles an application to play on a mobile device that includes a Flash Player. The application is authored using an application development tool and the mobile device is emulated using a model based upon the characteristics. The application is played within the model and the model is monitored to determine resource utilization of the application for the selected mobile device.

In another embodiment, a method authors an application to play on a mobile device that includes a Flash Player. The application is authored using an application development tool. Resource utilization of the application for the mobile device is estimated. The steps of authoring and estimating are repeated until the resource utilization is less than or equal to the resources available on the mobile device.

In another embodiment, a software product has instructions, stored on computer-readable media, wherein the instructions, when executed by a computer, perform steps emulating and profiling an application to play on a mobile device that includes a Flash Player, including: instruction for loading characteristics defining performance of the mobile device; instruction for emulating the mobile device using a model based upon the characteristics; instruction for playing the application within the model; and instruction for monitoring the application playing in the model to determine resource utilization of the application for the mobile device.

In another embodiment, an emulator profiles an application of a mobile device that includes a Flash Player, including: means for generating a model of the mobile device based upon mobile device characteristics, and means for playing the application within the model to determine resource utilization of the application when played by the mobile device.

In another embodiment, a method determines whether an application of a mobile device is operable. Characteristics are downloaded over Internet for one or more mobile devices to be emulated and the application for the mobile devices is tested, via the Internet, using an emulator to determine if the application is operable on the mobile device.

DETAILED DESCRIPTION OF THE FIGURES

Figure 1A:
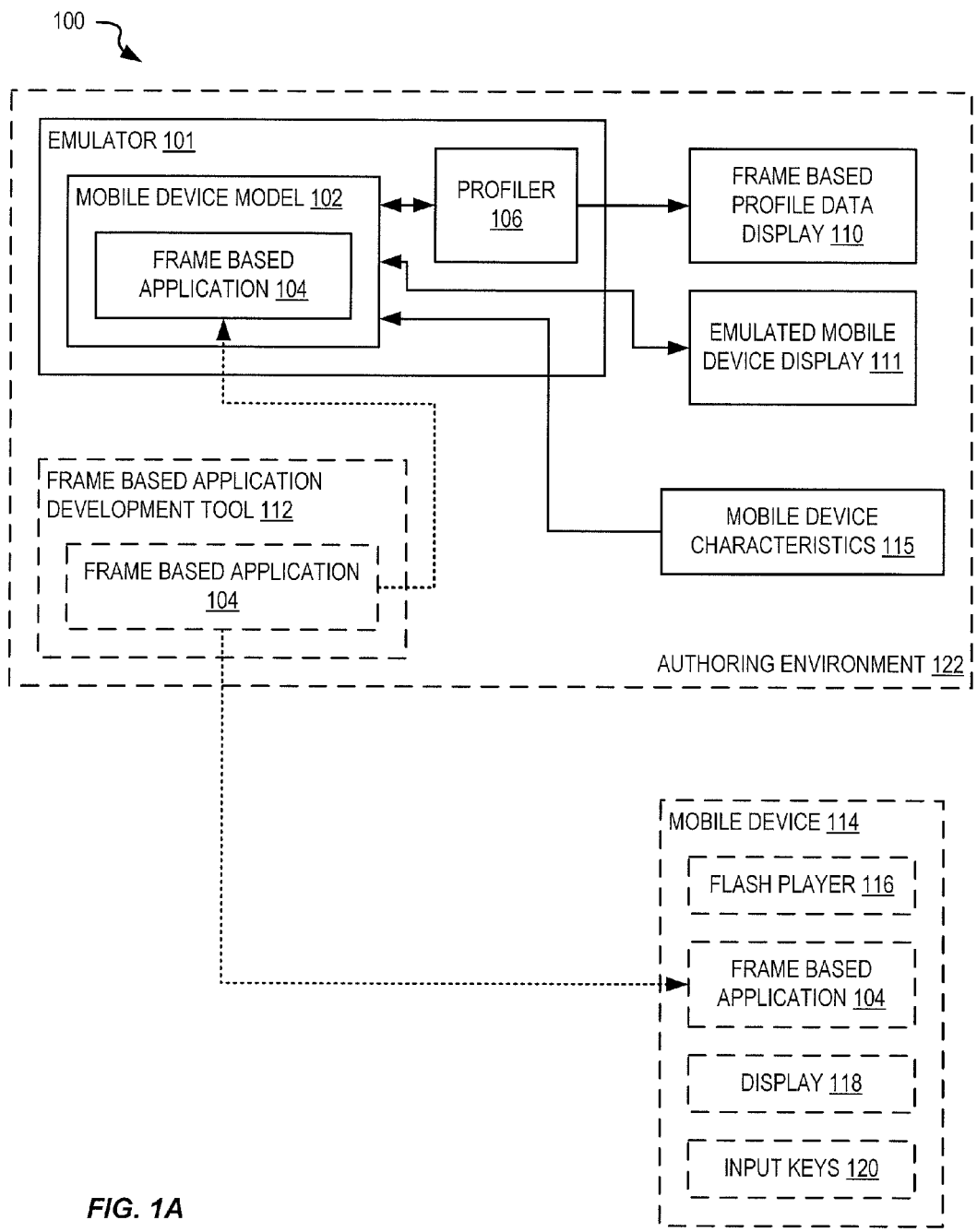
FIG. 1A shows one exemplary embodiment of a system for emulating, authoring and visually profiling an application playing on a mobile device that includes a Flash Player.

FIG. 1A shows one exemplary embodiment of a system 100 for emulating and profiling a frame based application 104 playing on a mobile device 114 that includes a Flash Player 116. System 100 is shown with an emulator 101, a profiler 106 and a display 110. Emulator 101 generates a mobile device model 102, based upon mobile device characteristics 115 of mobile device 114. Model 102 emulates mobile device 114 to play frame based application 104 and may, for example, generate an emulated mobile device display 111 that represents mobile device 114. Emulated mobile device display 111 may be interactive to allow a user to interact (in a manner similar to interacting with device 114) with application 104 while playing within model 102.

Profiler 106 monitors playing of frame based application 104 within model 102 to estimate resource usage of application 104 and generates a frame based profile data display 110. Frame based profile data display 110 may allow a user of system 100 to identify areas within application 104 that would exceed resources of mobile device 114.

Application 104 may be developed using a frame based application development tool 112 (indicated in dashed outline). Frame based application development tool 112 may, for example, represent Flash MX or Studio 8 from MacroMedia (now Adobe Systems). Once the user of system 100 has verified that application 104 does not exceed resources of mobile device 114, development tool 112 may be instructed to publish application 104 to device 114, as shown.

In one example of operation, development tool 112 is used to develop frame based application 104. Application 104 is transferred to emulator 101 for playing within mobile device model 102 to estimate resource usage of application 104 when played on mobile device 114. Upon playing application 104 within model 102, emulator 101 utilizes profiler 106 to determine resource utilization of application 104 based upon mobile device characteristics 115.

In one embodiment, emulator 101 is integrated with flash development tool 112 to form an authoring environment 122 that facilitates development and testing of application 104 without the need to continually load application 104 into mobile device 114.

In another embodiment, emulator 101 is an add-in module that may be configured to operate within flash development tool 112.

Mobile device 114 is shown with Flash Player 116, display 118 and input keys 120. In one embodiment, Flash Player 116 is FlashLite™ from Macromedia™ (Adobe Inc). Mobile device 114 may, for example, represent one of: a cell phone, a personal digital assistant (PDA), an interactive home appliances and other such devices. In one example, display 118 represents a color liquid crystal display (LCD) device for displaying text and images to a user of mobile device 114 and input keys 120 represent buttons that allow the user to interact with mobile device 114.

Figure 1B:
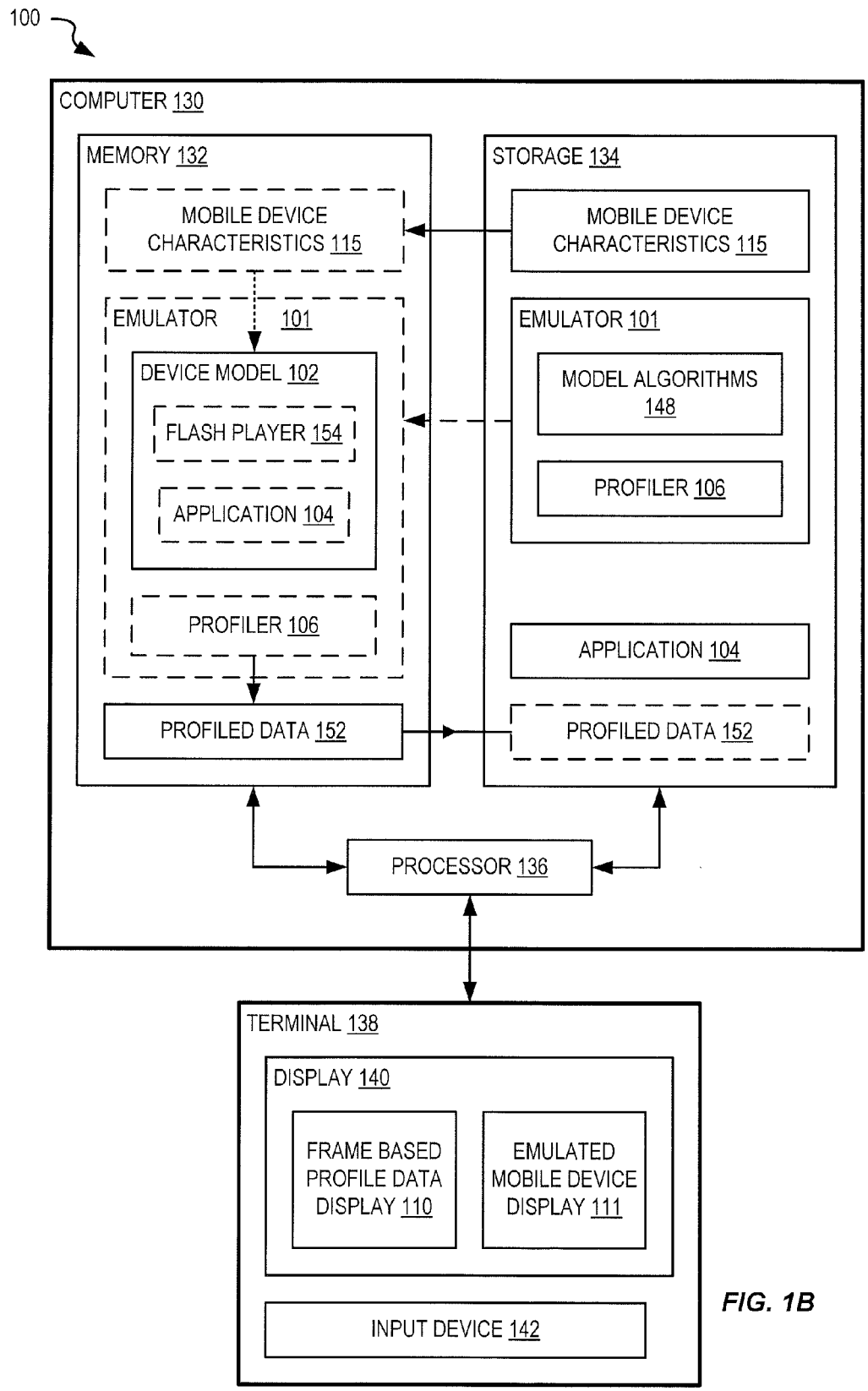
FIG. 1B shows one exemplary embodiment of the system of FIG. 1A within a computer.

FIG. 1B shows one exemplary embodiment of system 100 within a computer 130. Computer 130 includes memory 132, storage 134 and a processor 136. Memory 132 is for example random access memory (RAM) and storage 134 is for example a disk drive or other non-volatile storage media.

Storage 134 is shown with emulator 101, mobile device characteristics 115 and application 104. Storage 134 may also include development tool 112, if desired, for developing application 104. Emulator 101 includes model algorithms 148 and profiler 106. Model algorithms 148 represent one or more algorithms that operate to generate mobile device model 102 to emulate mobile device 114 while executing application 104. Specifically, model algorithms 148 define operation of mobile device 114 based upon mobile device characteristics 115.

TABLE 1

Mobile Device Characteristics

| Parameter | Value |
| --- | --- |
| Name | NOKIA 3650 |
| Processor | ARM 4T |
| Processor Speed | 104 MHz |
| Storage Access Speed | 5.88 files/second |
| RAM Size | 256 MB |
| Storage Size | 512 MB |
| Display Width | 256 |
| Display Height | 394 |
| Pixel Depth | 24 |
| Processor Availability | 60% |
| RAM Availability | 60% |
| Storage Availability | 40% |

Table 1 Mobile Device Characteristics shows exemplary characteristics that may be used to specify performance of model 102 to emulate mobile device 114. For example, in Table 1, the characteristics have the following meaning: 'Processor' specifies the type of the processor in mobile device 114; 'Processor Speed' specifies the clocked speed of the processor within device 114; 'Storage Access Speed' specifies the rate at which data can be moved from storage to memory and/or screen within device 114; 'RAM Size' specifies the size of the RAM in mobile device 114; 'Storage Size' specifies the size of the non-volatile memory in mobile device 114; 'Display Width' specifies the number horizontal pixels on display 118 of device 114; 'Display Height' specifies the number of vertical pixels of display 118; 'Pixel Depth' specifies the number of bits per pixel (e.g., the color depth) of display 118; 'Processor Availability' specifies the percentage of processing resource available for use by applications (e.g., where mobile device 114 represents a cell phone, the phone has to maintain 'phone' operations while running any applications, thus there may only be a portion of the maximum processing resource available to applications); 'RAM Availability' specifies the percentage of RAM available to applications; and 'Storage Availability' specifies the percentage of non-volatile storage space available to applications.

Table 1 may be represented as a data structure (e.g., shown as mobile device characteristics 115 within storage 134) and may be stored in a file (not shown) or a database (not shown) within storage 134, or stored remotely. System 100 may include mobile device characteristics (e.g., mobile device characteristics 115) for multiple devices (e.g., device 114). For example, characteristics 115 may be included for each mobile device type targeted by application 104. A user of system 100 may then select one or more target mobile devices from a list based upon available characteristics 115. As appreciated, additional or fewer characteristics may be included within characteristics 115 to specify performance of mobile device 114 without departing from the scope hereof.

As new mobile device types are created, additional mobile device characteristics 115 may be easily created to specify the performance of the new device types, allowing application development to start before a physical mobile device is available. For example, if a company introduces a new series of six mobile phone handsets, six additional mobile device characteristics 115 may be created based upon measured (e.g., by running benchmarks on the new handsets or prototype) or determined (e.g., by estimating performance based upon previous models) performance thereby allowing emulation and evaluation of applications targeting these new devices.

In one embodiment, mobile device characteristics 115 may be supplied with a device model specific to one mobile device. For example, a manufacturer may supply a combined device model and characteristics for each mobile device 114. Emulator 101 may then utilize the combined device model as device model 102.

In one example, computer 130 may include an interface (not shown) that provides communication with mobile device 114 via one or more of: USB, Ethernet, infra-red, Bluetooth, WiFi and other similar communication media. This interface may, for example, allow application 104 to be deployed on mobile device 114 for final testing of application 104.

In one example of operation, processor 136 loads at least part of emulator 101 into memory 132 for execution. Emulator 101 then generates mobile device model 102, based upon characteristics 115, within memory 132. Emulator 101 then loads and plays application 104 within model 102. Emulator 101 may load all or part of profiler 106 into memory 132 to monitor resources and/or performance of application 104 within model 102. Specifically, as application 104 is played (i.e., utilizing a Flash Player 154) within model 102, profiler 106 monitors and records, as profiled data 152, resources utilized by application 104. Profiled data 152 may be stored (as shown in dashed outline) within storage 134 and/or displayed as frame based profile data 110 on display 140 of terminal 138. In particular, frame based profile data 110 may be used to identify areas within application 104 where upon playing of application 104 within mobile device 114, performance of mobile device 114 would be stressed. Thus, areas where failure may occur within application 104 may be identified prior to running application 104 on mobile device 114. For example, emulator 101 may display all or part of profile data 152 on display 140 to facilitate development of application 104.

Figure 2:
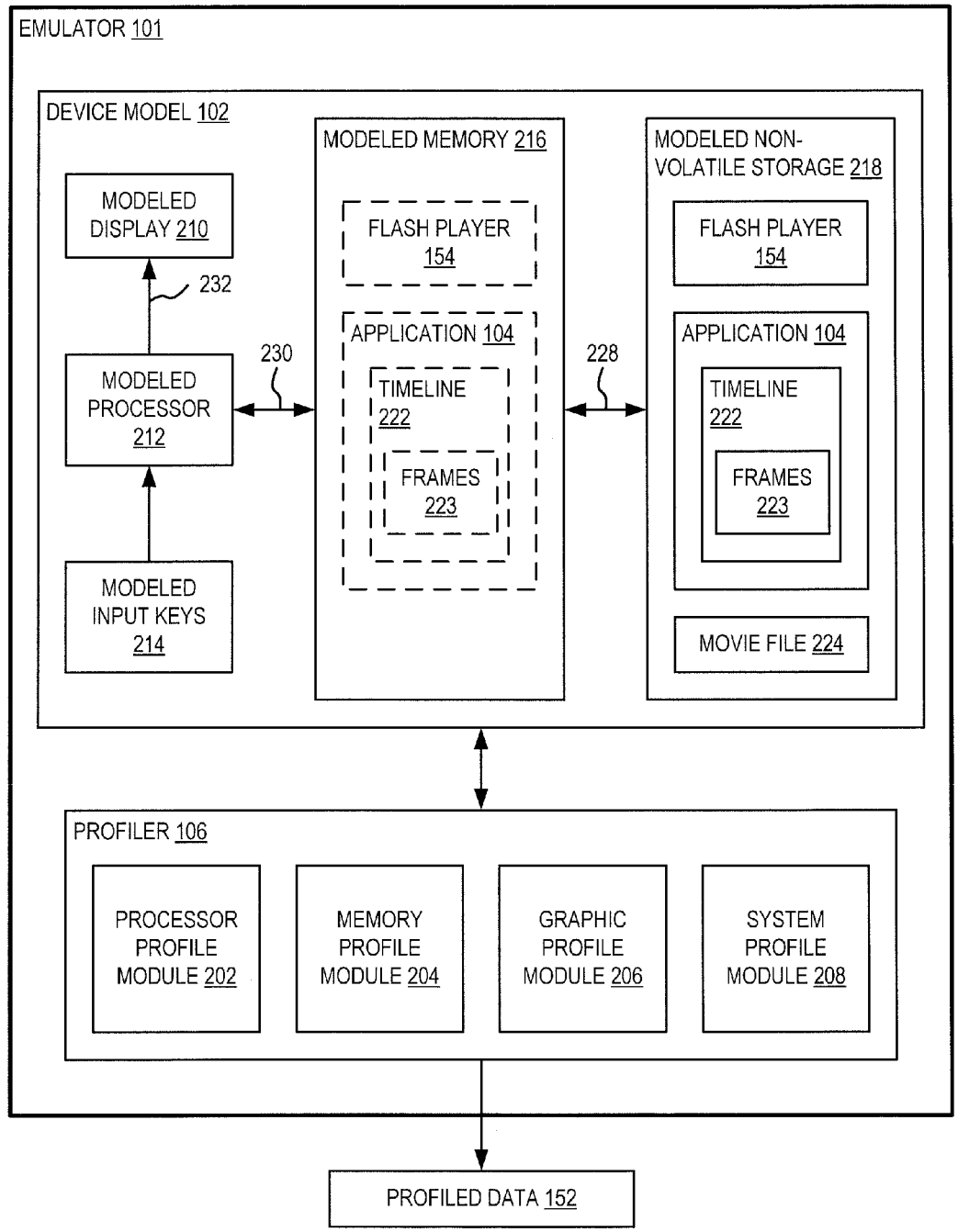
FIG. 2 is a block diagram illustrating detail of an emulator of the system of FIGS. 1A and 1B.

FIG. 2 is a block diagram illustrating emulator 101 of FIGS. 1A and 1B in further detail. In particular, profiler 106, within emulator 101, is shown with a processor profile module 202, a memory profile module 204, a graphic profile module 206 and a system profile module 208. Processor profile module 202 may, for example, estimate processor utilization of application 104 within model 102. Memory profile module 204 may, for example, estimate memory utilization by application 104 within model 102. Graphic profile module 206 may, for example, estimate utilization of 3D fill rate and 3D polygon count of application 104 within model 102. System profile module 208 may, for example, determine overall system utilization of application 104 within model 102. More or fewer profile modules may be included within profiler 106 without departing from the scope hereof.

Device model 102, within emulator 101, has a modeled display 210, a modeled processor 212, modeled input keys 214, modeled memory 216 and modeled non-volatile storage 218. In this example, modeled display 210 represents display 118 of mobile device 114, FIG. 1, processor 212 represents a processor (not shown) of mobile device 114, modeled input keys 214 represent input keys 120 of mobile device 114, modeled memory 216 represents memory (e.g., RAM) of mobile device 114 and modeled non-volatile storage 218 represents non-volatile storage (e.g., flash memory, disk drive storage) of mobile device 114. Fewer or more elements and/or components of mobile device 114 may be modeled within device model 102 without departing from the scope hereof.

Modeled non-volatile storage 218 is shown with Flash Player 154 that may be the same as, or similar to, Flash Player 116, FIG. 1. In one example, Flash Player 154 has similar operation to Flash Player 116, but includes modifications that facilitate monitoring of application 104 within model 102 by profiler 106.

Flash applications are based upon a timeline of frames that may include graphical information and action scripts, FS Commands, network protocols, selected frame rate, etc. Flash Player 116 within mobile device 114 thus operates upon a time line of frames within application 104 to provide graphical displays (e.g., animations, rich media content) upon display 118. Accordingly, profiled data 152 may also be based upon the timeline and frames of application 104 and displayed (e.g., frame based profile data 110) as resource utilization related to one or more of: timeline, frames and processing performance of action scripts.

In FIG. 2, application 104 is shown with a timeline 222 that includes frames 223. Each frame of frames 223 may include graphics and/or action scripts that generate the graphical image for display. For example, an action script may reference one or more graphic files (e.g., movie file 224) to provide graphical images for display 111. Where each frame of frames 223 includes multiple graphic elements and/or action scripts that involve image manipulation (e.g., retrieving data from non-volatile storage, Avatar manipulations, animations, etc.), each frame may require differing resources in order to display correctly. For example, where a frame includes Avatar (e.g., an animated character) manipulation, a certain amount of processor resource is required, whereas a frame that is based upon movie file 224 may simply require data transfer time. If mobile device 114 has insufficient processor resources (e.g., because the animation is too complex for the targeted mobile device), application 104 may crash (i.e., cease to function correctly). Thus, it is important to determine the 'stress' applied by application 104 to resources of mobile device 114.

In one example of operation, Flash Player 154 plays application 104 within model 102. In particular, player 154 processes frames 223 of application 104 based upon ordering of timeline 222. One or more profiler modules 202, 204, 206 and 208 within profiler 106 monitor resource utilization of each frame, storing results as profiled data 152. Profiled data 152 is then displayed as frame based profile data 110 on display 140 for review by the user. Profile data 152 may be displayed in real time as application 104 is played within model 102. Alternatively, the user may scroll through profile data 152 as desired by interacting with data display 110. Alternatively, profile data 152 may be output as a report (not shown). The user interacts with emulated mobile device display 111 to control application 104 as if application were running on device 114.

Figure 3:
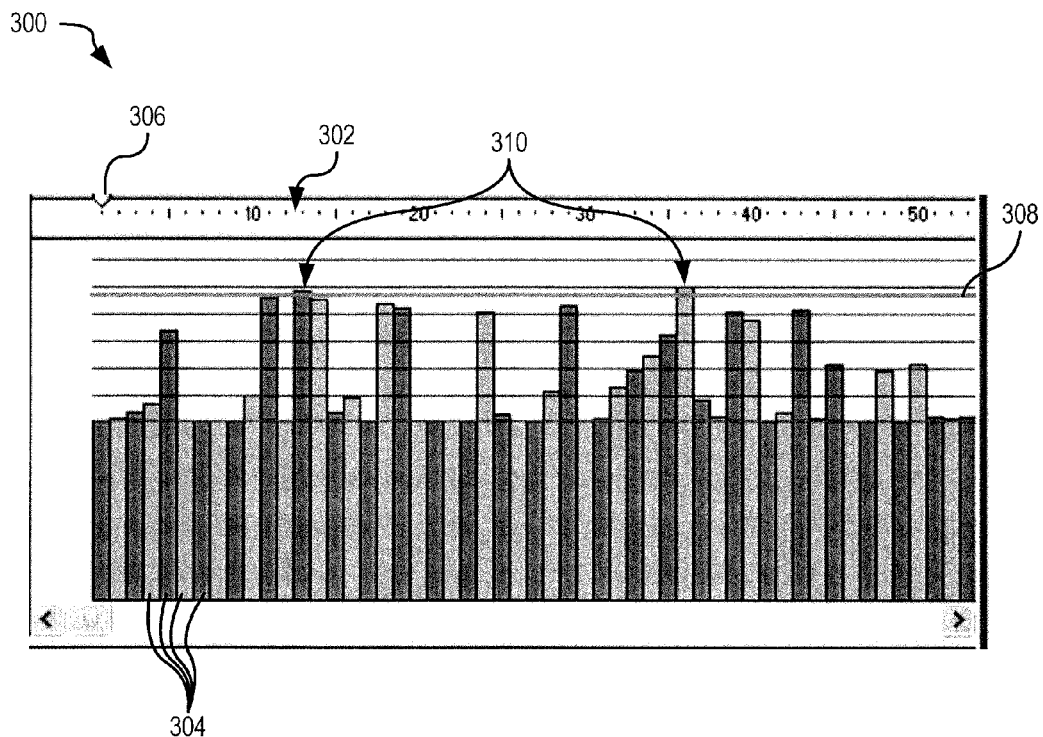
FIG. 3 is a display showing one exemplary frame based profile graph.

FIG. 3 shows one exemplary display 300 showing a frame based display of profiled data 152, FIG. 1A, determined by processor profile module 202. In particular, display 300 is shown with a time line 302 that represents timeline 222 of application 104. In this example, each bar 304 indicates processor resource utilization for certain frames 223 of application 104. During play of application 104 within model 102, a current position indicator 306 shows the frame (i.e., frame 1 in this example) currently displayed by emulated mobile device display 111 (see FIG. 4). A capacity line 308 (capout) indicates the maximum processor resource available to application 128. Where bars 304 rise above capacity line 308 at locations 310, resource utilization for indicated frames of application 104 exceed the available processor resources of mobile device 114; thus application 104 may 'capout' or crash when playing those frames. Display 300 clearly displays processor resource utilization by frame 223 of application 104, thereby facilitating assimilation of stresses applied to mobile device 114 when playing application 104.

Other profile modules 204, 206 and 208, may have similar displays that clearly indicate resource utilization during playing of application 104 within model 102, thereby estimating resource utilization of application 104 when played within mobile device 114.

Figure 4:
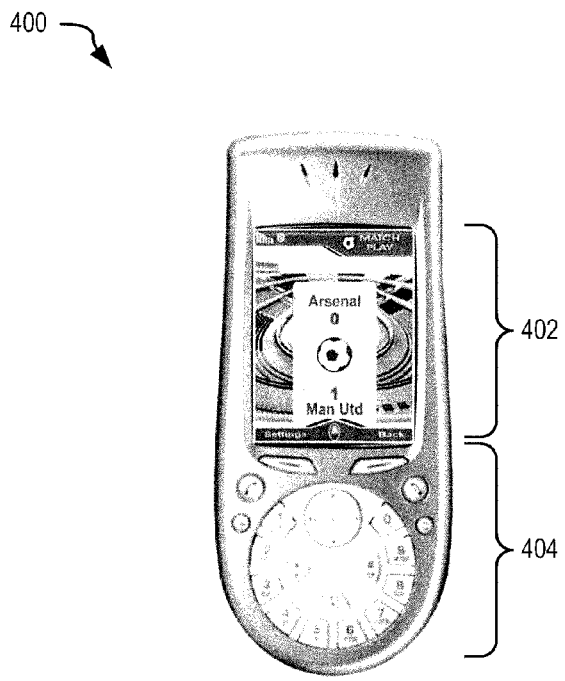
FIG. 4 is a display showing the modeled mobile device of FIGS. 1A and 1B.

FIG. 4 shows one exemplary display 400 generated from device model 132 within emulator 120, FIG. 1. In particular, display 400 shows an image (e.g., generated from a bitmap of mobile device 114) of mobile device 114 with a display area 402 and input keys 404. Display 400 allows the user to see and interact with an application running within device model 132. For example, display area 402 may represent display 118 of mobile device 114 and input keys 404 may represent input keys 120 of mobile device 114.

Figure 5:
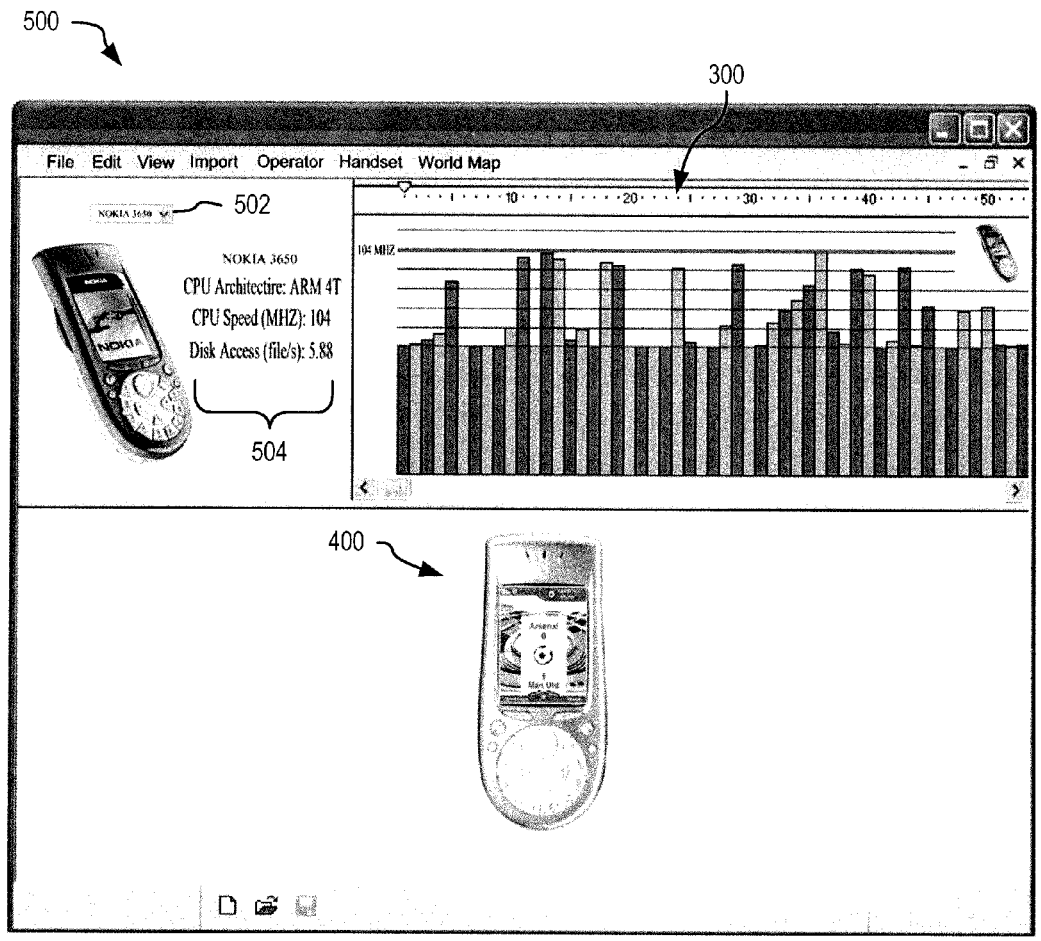
FIG. 5 shows one exemplary window that includes the display of FIG. 3, the display of FIG. 4 and an exemplary user interface.

FIG. 5 shows one exemplary window 500 that includes display 300 of FIG. 3 and display 400 of FIG. 4 and an exemplary user interface. In particular, window 500 shows selection of a mobile device (i.e., NOKIA 3650 in this example) from a pull-down list 502 that results in display of characteristics 504 of the selected mobile device. Characteristics 504 may represent characteristics 115 of FIG. 1A, for example. Window 500 facilitates interaction with model 102 through display 400 and monitoring of resource utilization of application 104 through window 300. Further, pull-down list 502 allows easy selection of further mobile devices upon which application 104 is to be profiled.

Figure 6:
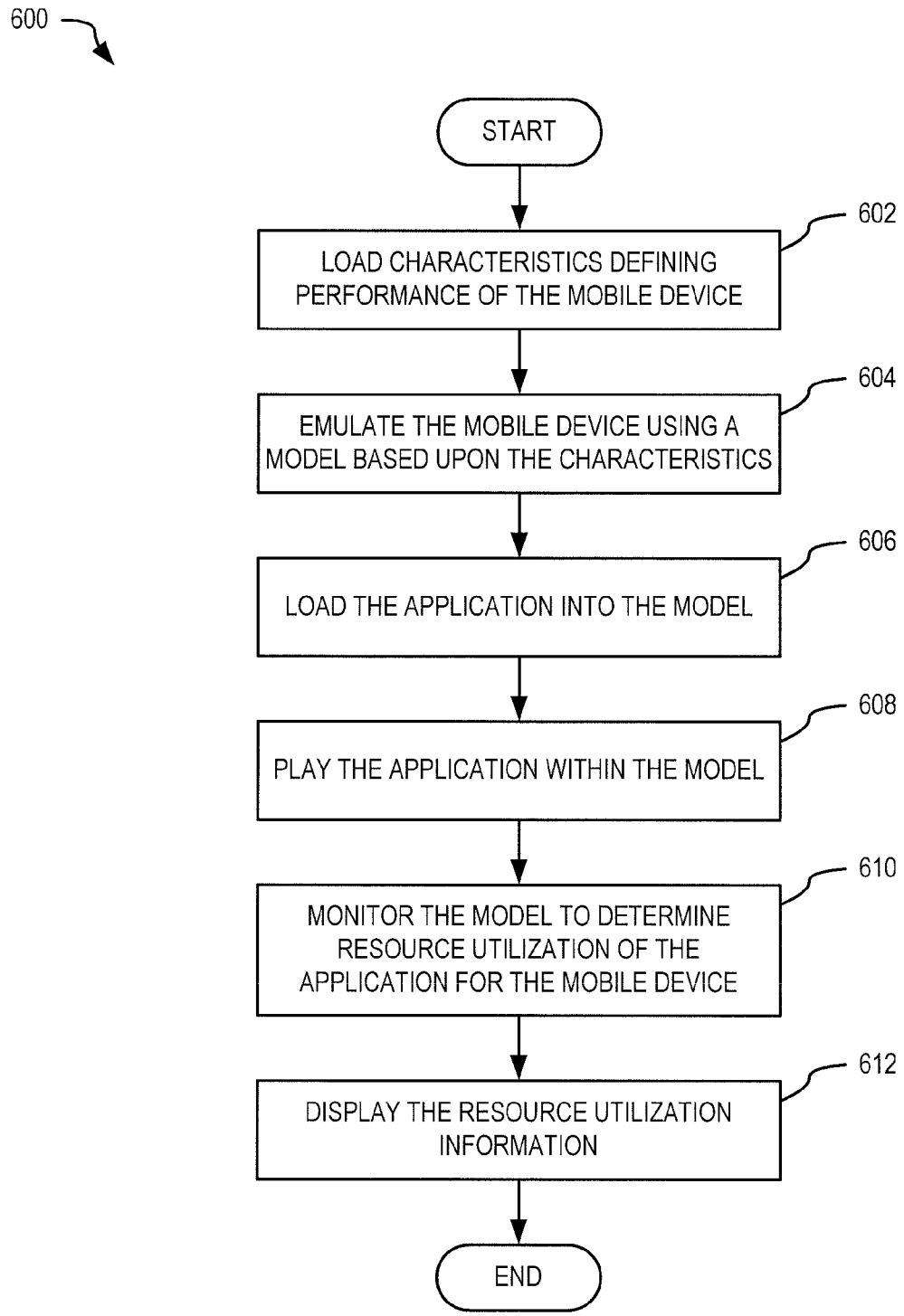
FIG. 6 is a flowchart illustrating a method for modeling and profiling an application to play on a mobile device that includes a Flash Player.

FIG. 6 is a flowchart illustrating a method 600 for modeling and profiling an application playing on a mobile device that includes a Flash Player. Method 600 may, for example, be implemented within emulator 101.

In step 602, method 600 loads characteristics defining performance of the mobile device. In one example of step 602, a user of window 500 selects a mobile device using pull-down list 502 and emulator 101 loads mobile device characteristics 115 into memory 132.

In step 604, method 600 emulates the mobile device using a model based upon the characteristics. In one example of step 604, emulator 101 generates device model 102 based upon mobile device characteristics 115.

In step 606, method 600 loads the application into the model. In one example of step 606, emulator 101 loads application 104 into device model 102.

In step 608, method 600 plays the application within the model. In one example of step 608, emulator 101 plays application 104 within model 102.

In step 610, method 600 monitors the application playing in the model to determine resource utilization of the application for the mobile device. In one example of step 610, emulator 101 utilized profiler 106 to monitor application 104 playing within model 102 to determine profiled data 152.

In step 612, method 600 displays the resource utilization information. In one example of step 612, emulator 101 displays all or part of profiled data 152 as frame based profile data 110 on display 140.

Figure 7:
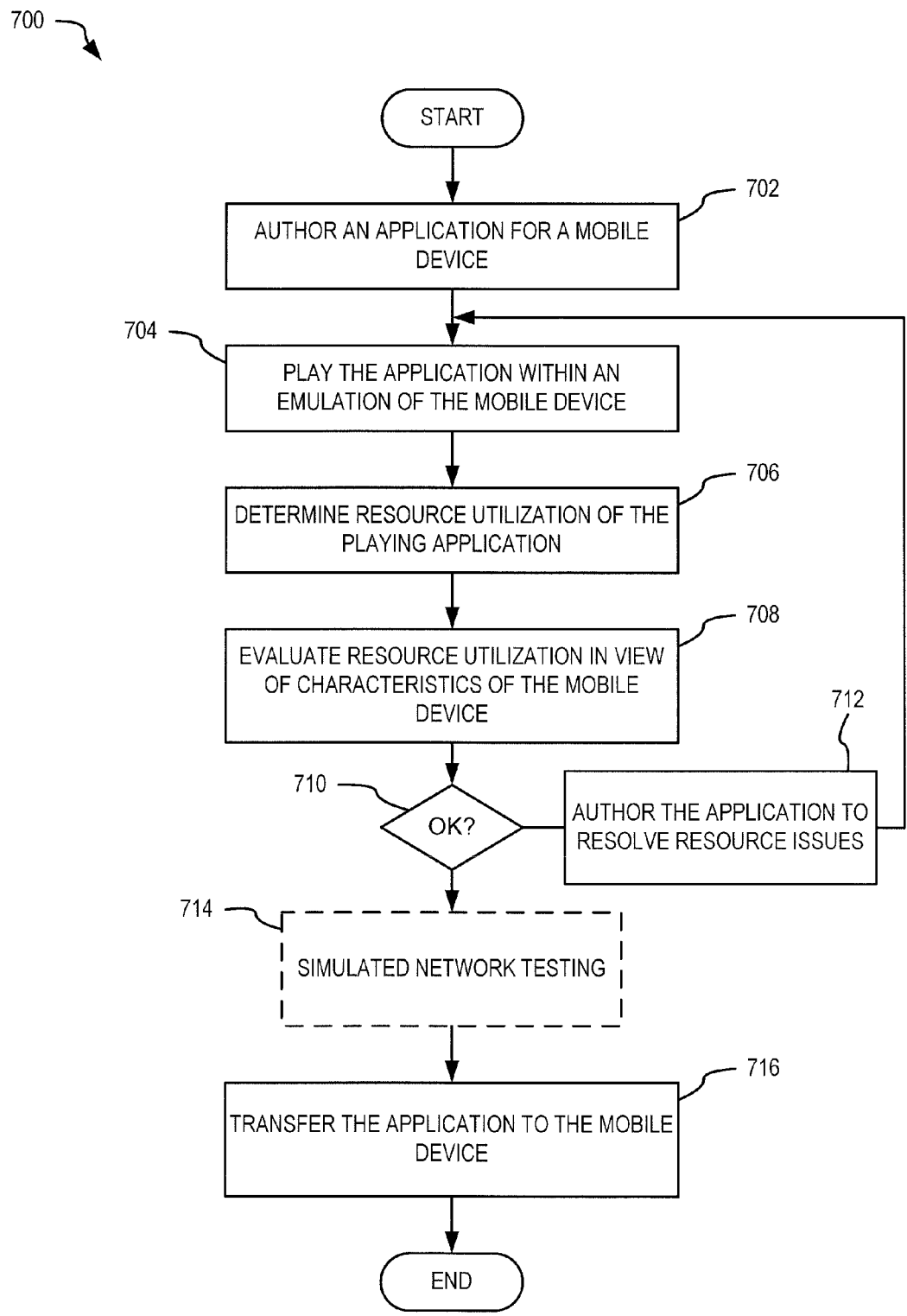
FIG. 7 is a flowchart illustrating one method for authoring, emulating and profiling an application to play on a mobile device that includes a Flash Player.

FIG. 7 is a flowchart illustrating one method 700 for authoring, emulating and profiling an application to play on a mobile device that includes a Flash Player. Method 700 may be implemented within emulator 101, for example.

In step 702, method 700 authors an application for a mobile device. In one example of step 702, a user interacts with frame based application development tool 112 to author application 104.

In step 704, method 700 plays the application within an emulation of the mobile device. In one example of step 704, emulator 101 generates model 102 based upon characteristics 115 of mobile device 114 and then loads and plays application 104 within model 102.

In step 706, method 700 determines resource utilization of the playing application. In one example of step 706, emulator 101 utilizes one or more profile modules 202, 204, 206 and 208 of profiler 106 to determine resource utilization of application 104 within model 102 and stores the resource utilization information as profiled data 152.

In step 708, method 700 evaluates resource utilization in view of characteristics of the mobile device. In one example of step 708, emulator 101 evaluates profiled data 152 to determine, based upon characteristics 115, if resource utilization is within available resources of mobile device 114.

Step 710 is a decision. If in step 710, method 700 determines that the resource utilization of step 708 is within available resources of mobile device 114 (i.e., OK), method 700 continues with step 714; otherwise method 700 continues with step 712.

In step 712, method 700 authors the application to resolve resource issues. In one example of step 712, the user modifies application 104, based upon determined resource utilization of step 708, using development tool 112. Method 700 continues with step 704. Steps 704 though 712 thus repeat until the estimated resources requirement of the application is within available resources of the mobile device.

Step 714 is optional and is particularly suited for testing applications (e.g., application 104) running on a mobile device (e.g., mobile device 114) that is a mobile phone. In step 714, emulator 101 interacts with one or more operator development servers (e.g., operator development server 808, FIG. 8) to configure device model 102 for simulated network operation to allow testing of application 104 within a simulated wireless network environment (e.g., a simulated mobile phone wireless network environment). Simulated network operation is described in further detail below and shown in FIGS. 8 though 13.

In step 716, method 700 transfers the application to the mobile device. In one example of step 716, emulator 101 instructs development tool 112 to publish application 104 to mobile device 114.

Figure 8:
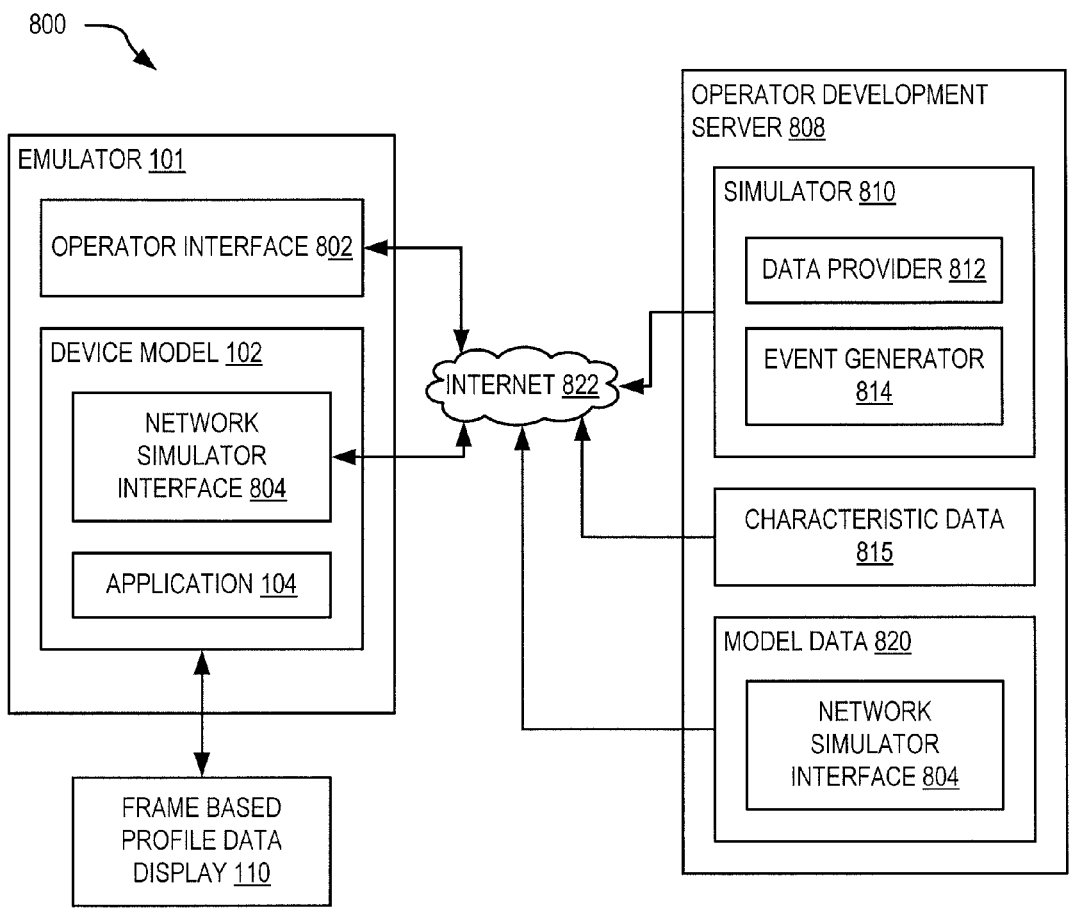
FIG. 8 is a block diagram illustrating the emulator of FIG. 1 interacting with an operator development server via the Internet for simulating playing of the application within a mobile device connected to a wireless network.

FIG. 8 is a block diagram illustrating interaction of emulator 101 with an operator development server 808 via Internet 822 for simulating playing of application 104 within a mobile device connected to a wireless network (e.g., a mobile phone wireless network). FIGS. 9, 10, 11 and 12 show exemplary windows that allow a user to interact with emulator 101 for configuring and testing operation of application 104 within model 102 when simulating connection to a wireless network. FIGS. 8, 9, 10, 11 and 12 are best viewed together with the following description.

Emulator 101 is shown with an operator interface 802 that interacts with operator development server 808 via Internet 822. Internet 822 may, for example, represent the world wide web (WWW), an Intranet or any fixed or wireless server connection. Operator development server 808 is shown with a simulator 810, characteristic data 815 and model data 820. Model data 820 may, for example, represent live network profiles. To facilitate connection to operator development server 808, a user of emulator 101 purchases a subscription from a provider of operator development server 808 (or from a third party) that allows emulator 101 to connect to operator development server 808 via Internet 822. Upon connection to operator development server 808, emulator 101 may download characteristic data 815 from operator development server 808 for one or more mobile device types supported by operator development server 808 (i.e., supported by the operator's wireless network). Characteristic data 815 may, for example, represent mobile device characteristics 115 of FIG. 1. Further, emulator 101 may download additional model data 820 for use within device model 102 for increasing simulated functionality of model 102 (e.g., simulating additional handset functionality and/or network functionality). The user of emulator 101 may, for example, purchase data 820 for additional mobile device types as they become available, thereby allowing emulator 101 to include modeling capability for a new pre-release mobile device, scheduled release mobile device and current mobile devices. Alternatively, the use of data 815 and data 820 may be includes within a monthly subscription fee, thereby allowing the user to author applications for new mobile devices (e.g., new mobile phone models and live mobile profiles) provided by an operator (e.g., mobile phone wireless network operator).

In one example of operation, emulator 101 downloads a network simulator interface 804 from operator development server 808 into device model 102 as shown in FIG. 8. Network simulator interface 804 includes functionality that allows device model 102 to communicate with simulator 810 to simulate connectivity of mobile device 114 with a wireless network. Specifically, network simulator interface 804 within model 102 interacts with data provider 812 and event generator 814 to determine resource utilization resulting from network interaction by model 102. Thus, as application 104 plays within model 102, the effects of device 114 interacting with a wireless network are simulated such that frame based profile data display 110 shows resource utilization that includes the live or scripted effects of interaction with the wireless network. In one embodiment, capacity line 308 of display 300 within profile data display 110 is dynamically modified to show actual resource availability to application 104 resulting from resource utilization by simulated wireless network activity within device model 102. For example, if a message is received and/or retrieved by model 102 while playing application 104, certain resources are required to handle the received message, and therefore available resources for application 104 is reduced accordingly.

Simulator 810 is shown with a data provider 812 and an event generator 814. Data provider 812 may, for example, simulate data transfers within a wireless network. For example, the data transfer may be cased upon a certain bandwidth associated with the wireless network. Event generator 814 may, for example, generate certain events (e.g., incoming calls, incoming text messages, etc) that occur within a wireless network. Simulator 810, using data provider 812 and event generator 814, thus interacts with network simulator interface 804 to model operation of a wireless network (e.g., a mobile phone network).

Operator interface 802 may interact with multiple operator development servers 808 to facilitate testing of application 104 with many operators' networks. As appreciated, where application 104 is designed to function on multiple mobile devices operating on wireless networks worldwide, operator network simulation removes the burden of traveling to operator network locations from application developers, since application operation on a mobile device connected to a network may be simulated by emulator 101 and thus measured back against the authoring environment.

Figure 9:
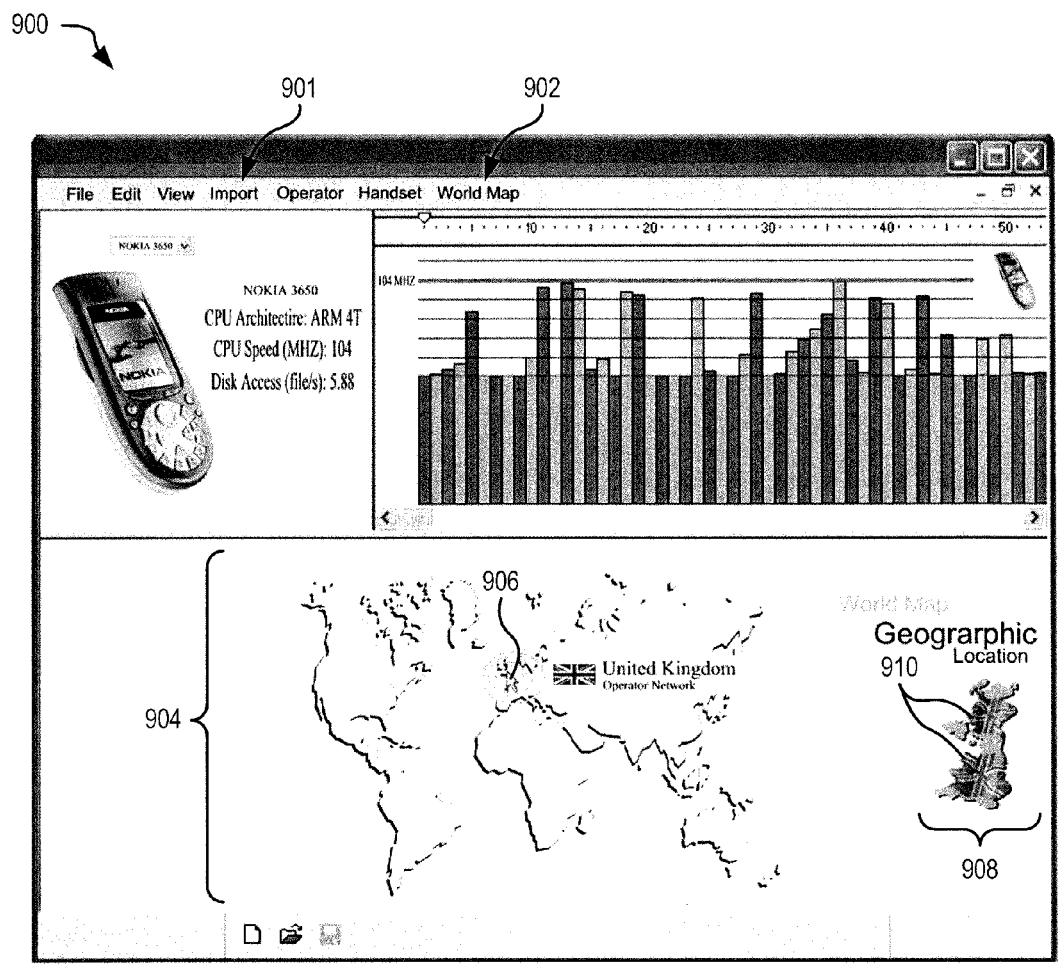
FIGS. 9, 10, 11 and 12 show exemplary user interface screens for interacting with the emulator of FIG. 1 to configure and test operation of the application within the model of the mobile device when connected to a wireless network.
Figure 10:
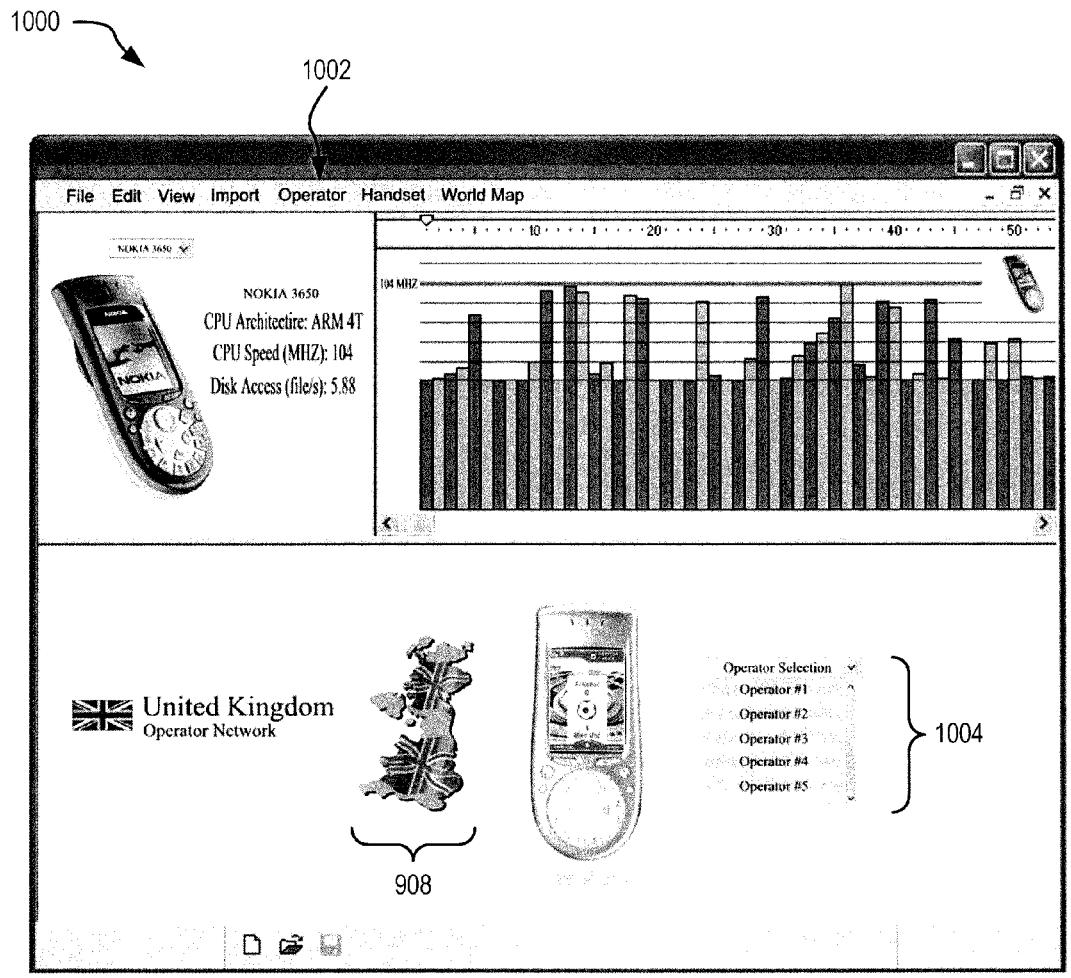

FIG. 9 shows one exemplary window 900 for selecting operator networks based upon geographic location. Window 900 shows a menu item 902 that, upon selection by the user, displays a world map 904 that allows the user to select a geographical region in which mobile device 114 is to operate. For example, window 900 shows a mouse pointer 906 selecting the United Kingdom, resulting in a sub-map display 908 of the selected location showing available wireless networks 910. Sub-map display 908 is, for example a 'mouse-over' event. Upon selection of the location, world map 904 is replaced by sub-map 908 of the selected location and a pull-down list 1004 of available operators within that location as shown in window 1000, FIG. 10. Alternatively, the use may select menu item 1002 to display pull-down list 1004.

Figure 11:
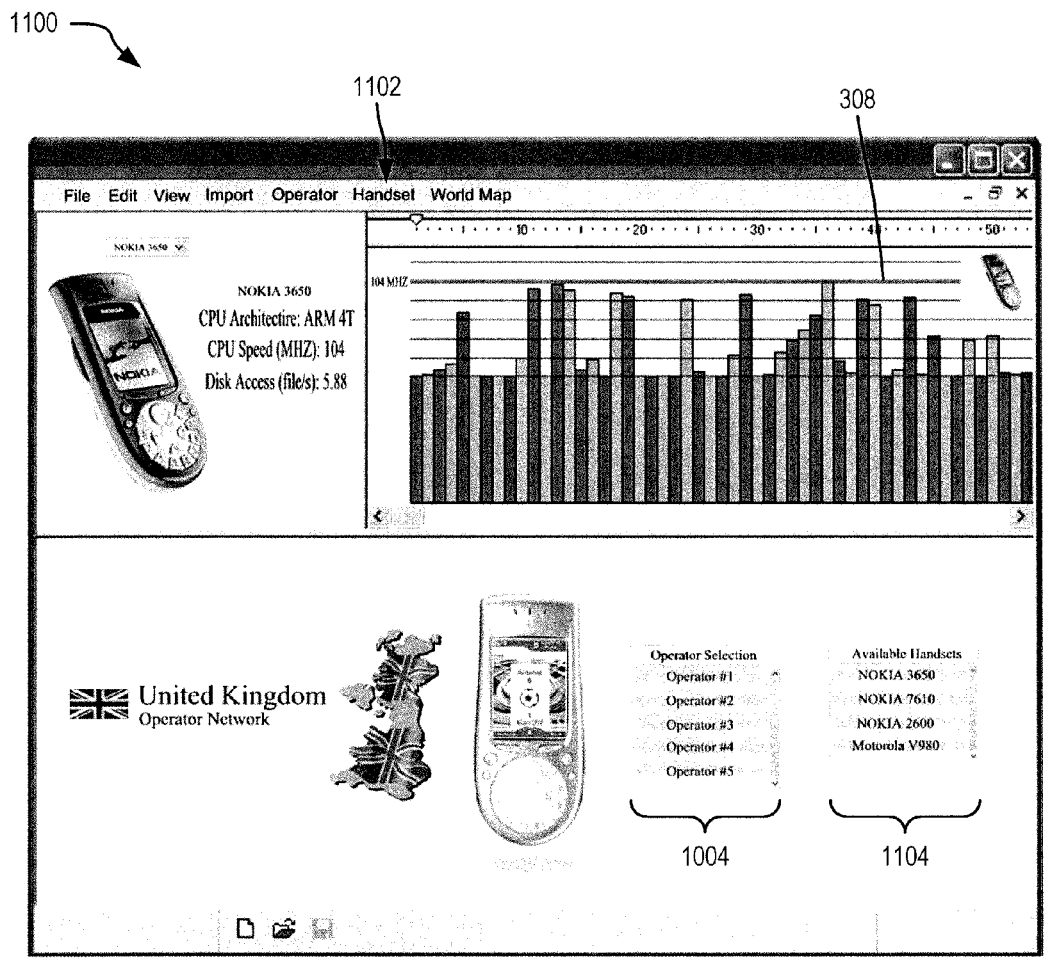
Figure 12:
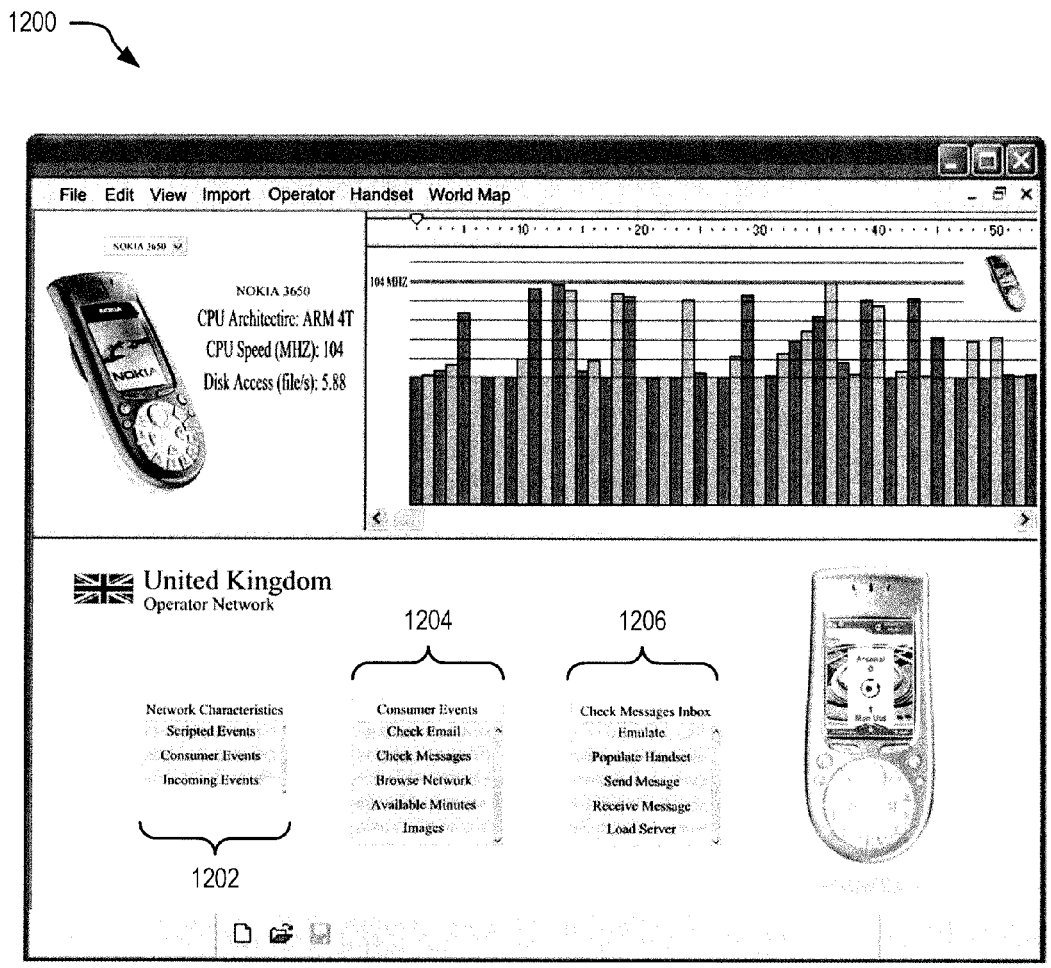

Upon selection of an operator within list 1004, emulator 101 displays a pull-down list 1104 of mobile devices supported by the selected operator, as shown in window 1100 of FIG. 11. Alternatively, the use may select the menu item 1102 to display list 1104. Upon selection of a mobile device from list 1104, window 1200, FIG. 12, is displayed to allow the user to select desired network characteristics for simulation.

Window 1200 shows a pull-down list 1202 of network characteristics that may be simulated by simulator 810. For example, simulator 810 may allow control of scripted events (e.g., cell tower identification, service message, bandwidth, etc.), consumer events (e.g., checking email, checking messages, browsing network, available minutes, selecting images, etc.) and incoming events (e.g., phone calls, WAP Messages, receiving MMS, receiving SMS, etc.). Based upon selection from list 1202, a second list may be presented to allow further simulation requirements to be entered. In the example of window 1200, consumer events entry of list 1202 was selected, resulting in display of pull-down list 1204 from which check messages was selected resulting in the display of pull-down list 1206. In this example, the user may select 'send message' from list 1206 to evaluate the performance of application 104 while a message is received from the network.

In one embodiment, maps 904, 908 and lists 1004, 1104, 1202, 1204 and 1206 are based upon information received by operator interface 802 from one or more operator development servers 808. Thus, functionality of model 102 and selectable simulations of simulator 810 may be easily updated by the operator as new mobile devices are created without requiring updates to software of emulator 101.

Optionally, the user may select menu item 901, FIG. 9, to immediately locate, download and import modeling characteristics into emulator 101. These characteristics may be stored within storage 134 of computer 130, FIG. 1B.

Figure 13:
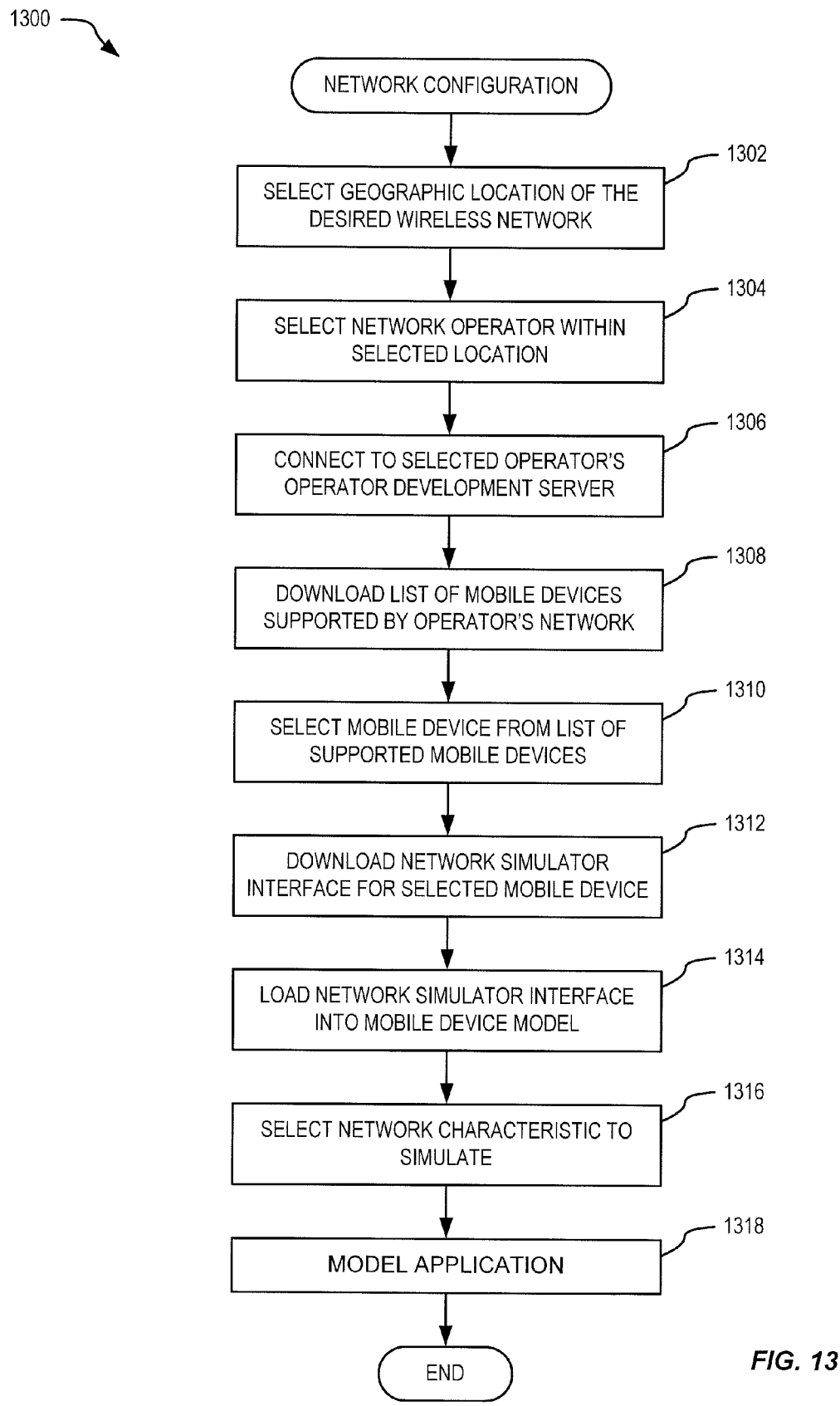
FIG. 13 is a flowchart illustrating one exemplary method for configuring network simulation.

FIG. 13 is a flowchart illustrating one exemplary method 1300 for configuring wireless network simulation.

In step 1302, method 1300 selects a geographic location of the wireless network. In one example of step 1302, emulator 101 displays window 900 and the user selects the United Kingdom as the wireless network location.

In step 1304, method 1300 selects a network operator from within the selected location. In one example of step 1304, emulator 101 displays window 1000 including pull-down list 1004 of network operators within the location selected in step 1302.

In step 1306, method 1300 connects to the selected network operator's development server. In one example of step 1306, emulator 101 utilizes operator interface 802 to connect to operator development server 808 based upon the operator selected in step 1304.

In step 1308, method 1300 downloads a list of mobile devices supported by the simulator of the operator selected in step 1304. In one example of step 1308, emulator 101 downloads characteristic data 815 from server 808 to determine mobile devices supported by simulator 810 and populates list 1104 of window 1100. Of note, an operator may add functionality to simulator 810 based upon a new mobile device prior to supporting the device within the operator's wireless network, thereby encouraging development of applications for the new device before its launch, increasing operator and/or author revenues.

In step 1310, method 1300 selects a mobile device from the list of supported mobile devices. In one example of step 1310, the user selects a mobile device for emulation from list 1104 of window 1100. In another example, where the user has already selected a mobile device from pull-down list 502, emulator 101 automatically selects the same device, if available, from list 1104.

In step 1312, method 1300 downloads a network simulator interface for the selected mobile device. In one example of step 1312, emulator 101 instructs operator interface 802 to download network simulator interface 804 from server 808.

In step 1314, method 1300 loads the network simulator interface into the mobile device model. In one example if step 1314, emulator 101 loads network simulator interface 804 into model 102.

In step 1316, method 1300 selects network characteristics to simulate. In one example of step 1316, the user utilizes lists 1202, 1204 and 1206 of window 1200 to specify network characteristics for simulation by simulator 810.

In step 1318, method 1300 models the application running within a mobile device connected to a wireless network. In one example of step 1318, model 102 interacts with simulator 110 via network simulator interface 804 and internet 822 while playing application 104 and displaying profile data display 110.

In one embodiment, the user may purchase and download simulator 810 from operator development server 808 to facilitate local simulation of the wireless network (i.e., without utilizing Internet 822). In this embodiment, simulator 810 may operate within emulator 101, within authoring environment 122 or within computer 130 to provide interaction with model 102.

Emulator 101 may utilize operator interface 802 to interact with one or more operator development servers 808 to download characteristics (e.g., characteristic data 815) and modeling data (e.g., model data 820) for generating mobile device model 102. As new mobile devices are made available, each application author (i.e., user) is able to download these modeling characteristics and test applications for the new mobile device. As mobile devices become more sophisticated and include additional hardware and functionality, emulator 101, though a subscription service with an operator, for example, may download this additional functionality for use in model 102. These characteristics (e.g., characteristic data 815) may include bitmaps, characteristics handset profiles, modeling algorithms, complete mobile device models, bandwidths etc. thereby automatically updating functionality of authoring environment 122. Wireless network operators participate by updating their development servers (e.g., development servers 808) to provide the latest emulation information and functionality for each supported mobile device (e.g., mobile phone handset) and by updating their network simulators (e.g., simulator 810) to includes functionality and/or proposed functionality of their wireless networks.

Application authors (e.g., users of emulator 101) are provided with a visual authoring environment in which the authored application may be emulated as operating within one or more modeled mobile devices (that are optionally connected to a simulated wireless network) without leaving the authoring environment.

The emulator (e.g., emulator 101) may be provided as part of the authoring environment, or as an add-on to an existing development tool. In an embodiment, characteristics for each mobile device to be emulated are downloaded from a server for a determined price or subscription fee. Since new mobile devices are continually being produced, application authors continually require new modeling characteristics to be able to test their applications. For example, a subscribed charge of $10-15 dollars per handset saves each developer from purchasing a mobile device ($100-200 dollars) and alleviates the need to travel to a wireless network location when testing each mobile device. Thus, the wireless network operator may receive revenue from developers by providing the developers with online network simulation capability. The application authors, via the Internet, are then able to test applications for mobile devices running on wireless networks worldwide.

Characteristics for each mobile device to be emulated may be downloaded from a server for a determined price, licensing or subscription fee. It is estimated that nearly 700 million new mobile devices will be shipped in 2005, with a new handset model being launched every other day. This rapid mobile device development requires that applications designed to run on these mobile devices also sustain rapid development. Development systems targeted at one mobile device may become obsolete and possibly of little value to the developer at the time it is shipped. Since a new mobile device is being launched every other day, application authors continually require purchasing all addressable targeted devices prior to consumer release. For example, a charge of $10-15 dollars per modeled handset would save each developer purchasing each target mobile device ($100-200 dollars) as well as alleviating the need to travel to a wireless network location whilst testing each mobile device before public release, two substantial development and release costs.

During development of an application for a mobile device, an application author may transfer and play the application hundreds of times (development life cycles) on the targeted mobile device before identifying and correcting all system resource problems within the application. Live server and profile updates would substantially reduce and alleviate a high churn rate of development life cycles, enabling a more cost effective authoring model for the developer. As well, although the purchase of a 'static' PC authoring environment may become obsolete due to the ongoing release of new mobile handsets (the target release platform) emulator 101 and operator development server 808 maintains a live and continually updatable business model and authoring platform long after the initial authoring platform has released to the market.

Figure 14:
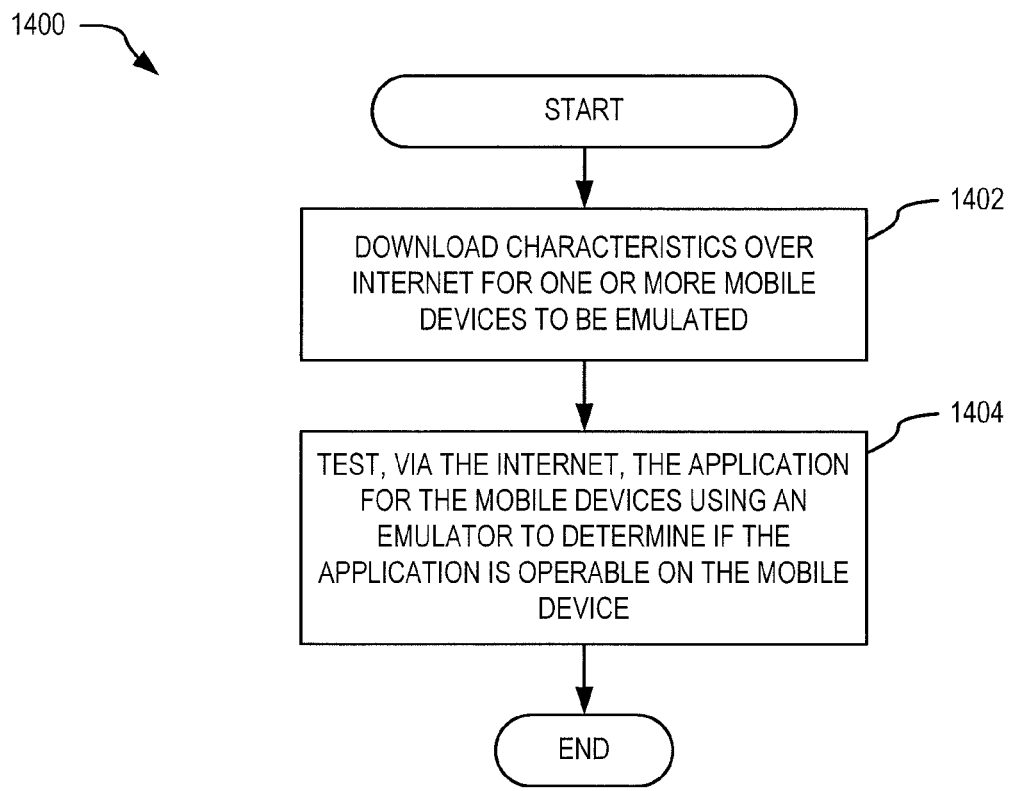
FIG. 14 is a flowchart illustrating one method for determining whether an application of a mobile device is operable.
Figure 1A:
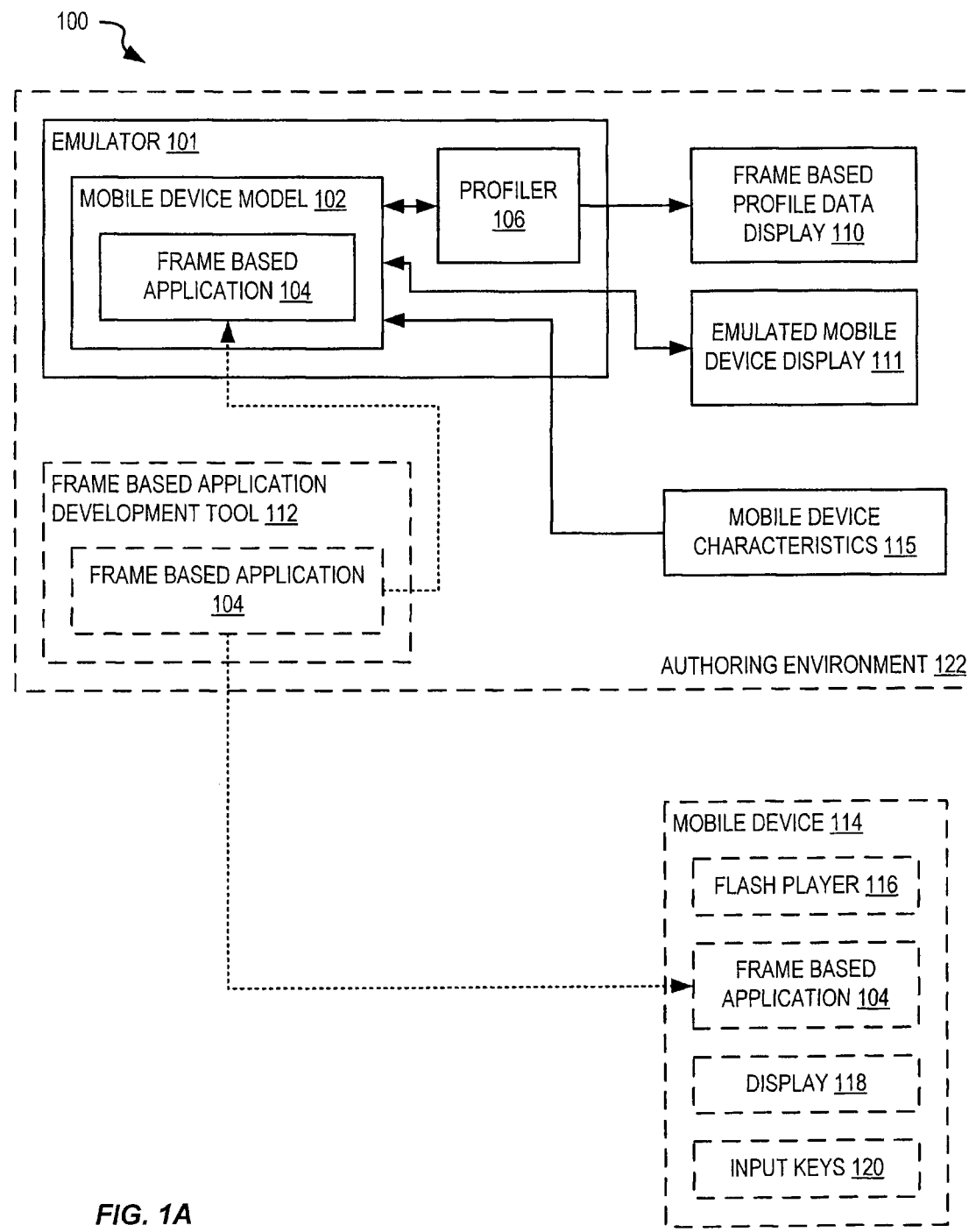
Figure 1B:
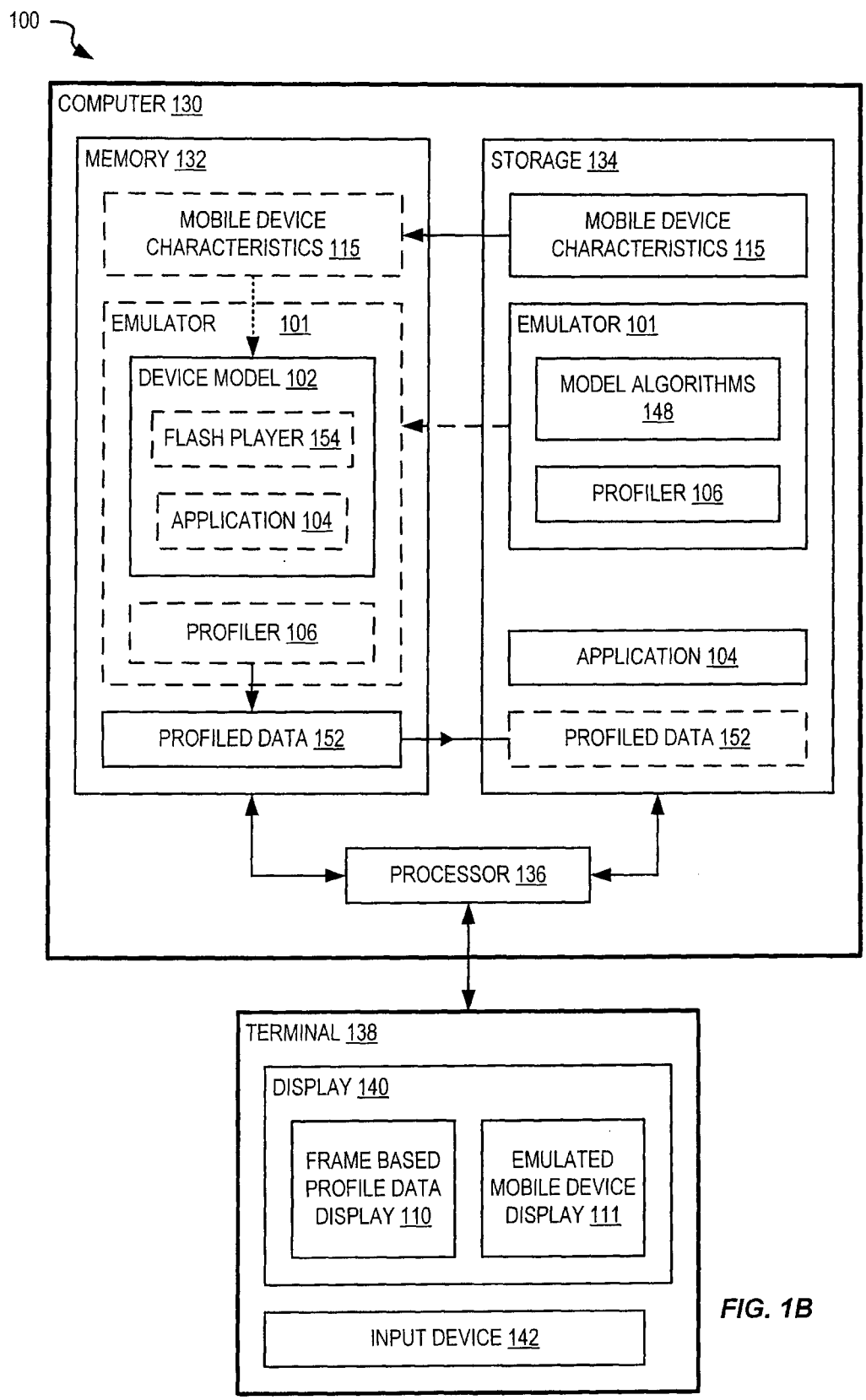
Figure 2:
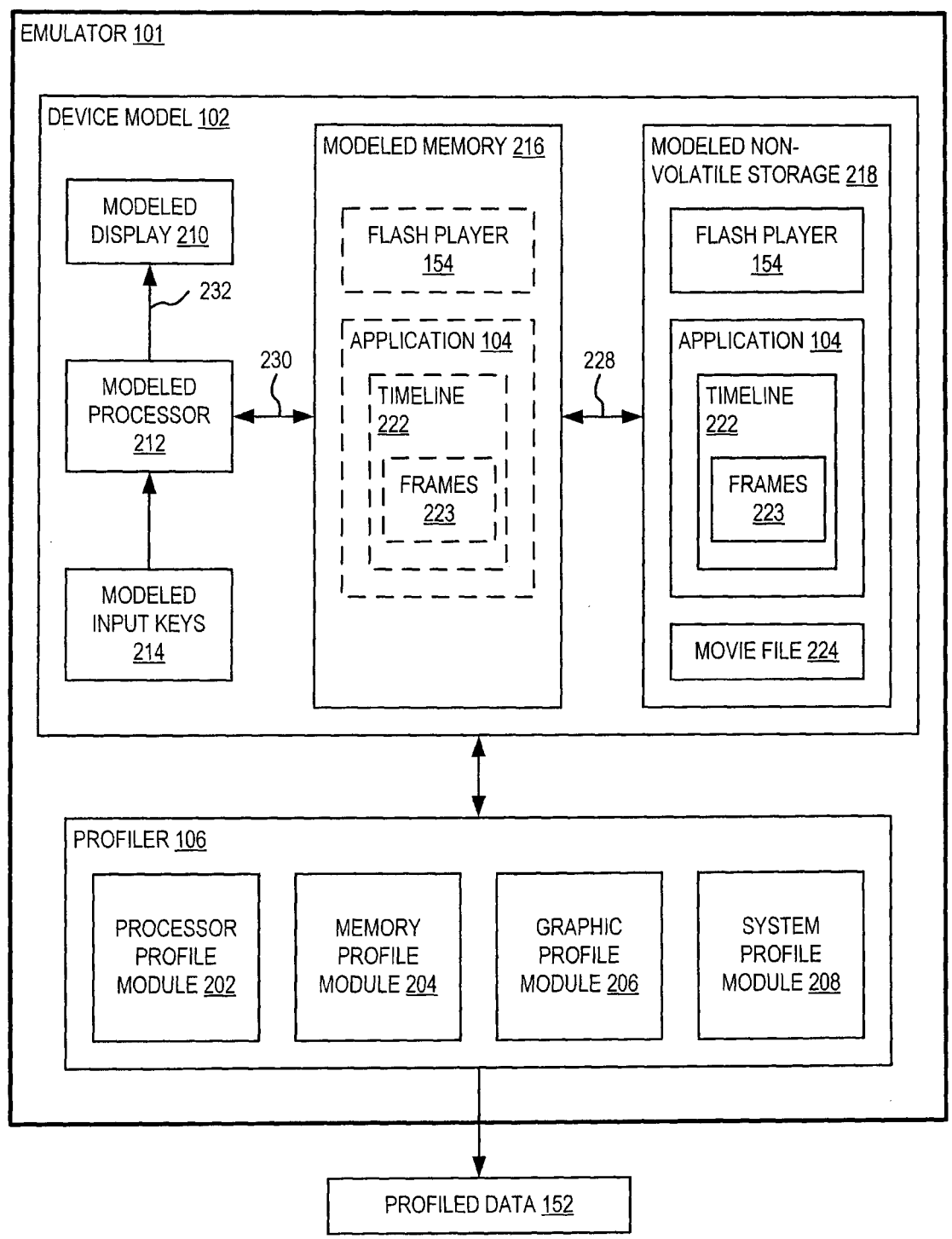
Figure 3:
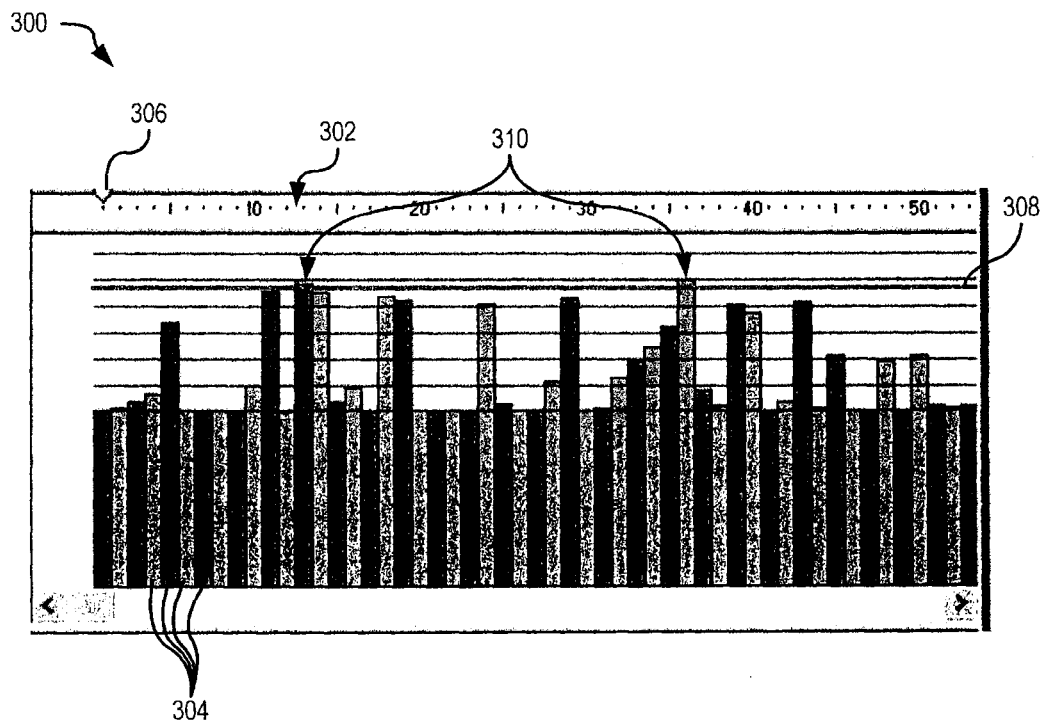
Figure 4:
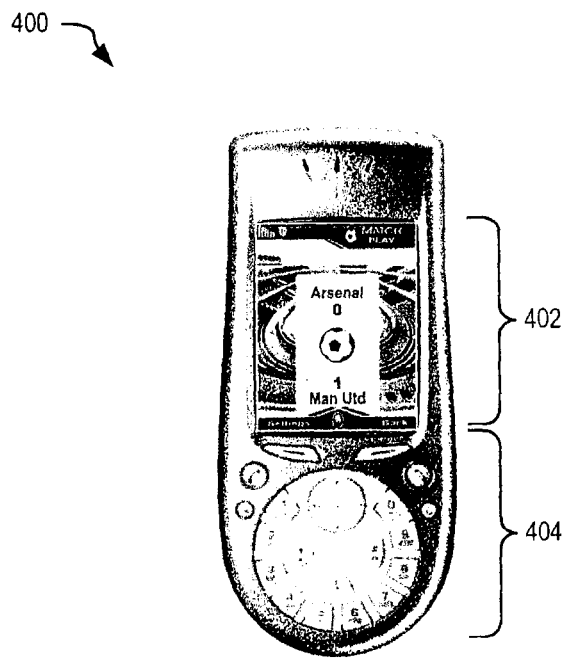
Figure 5:
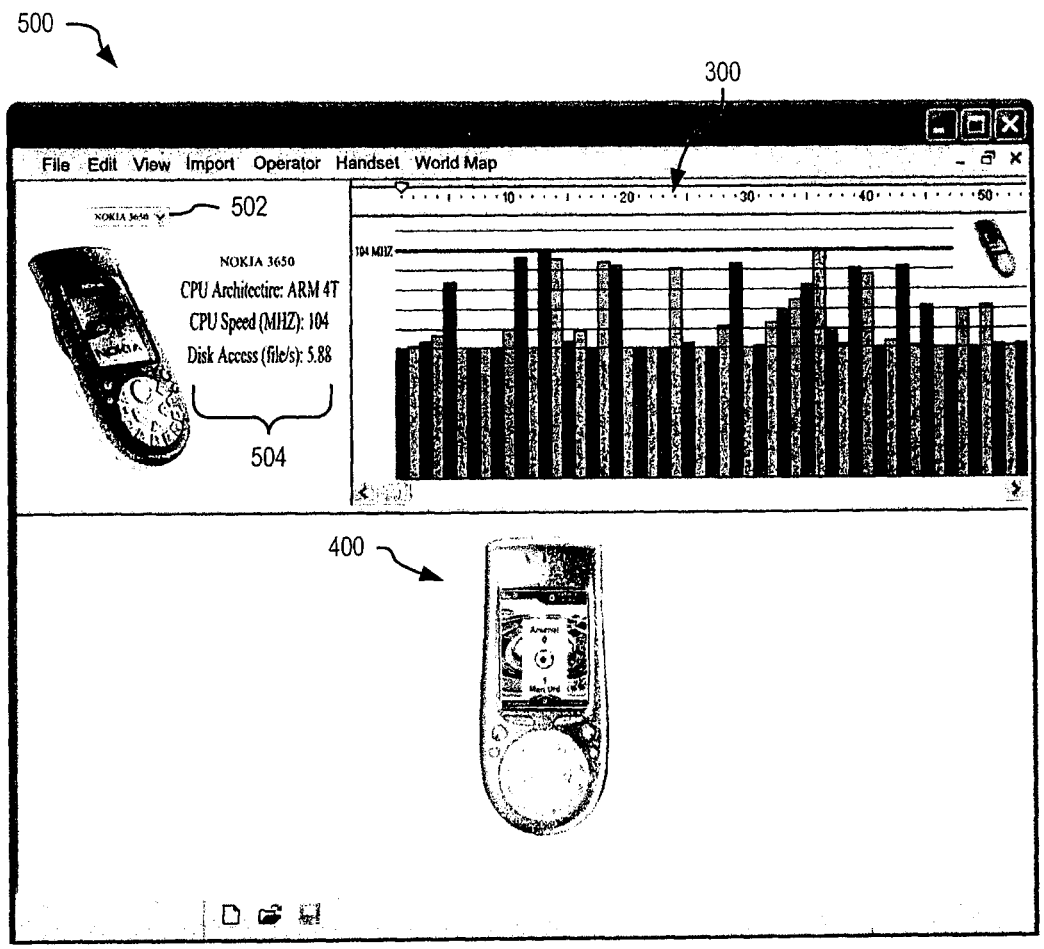
Figure 6:
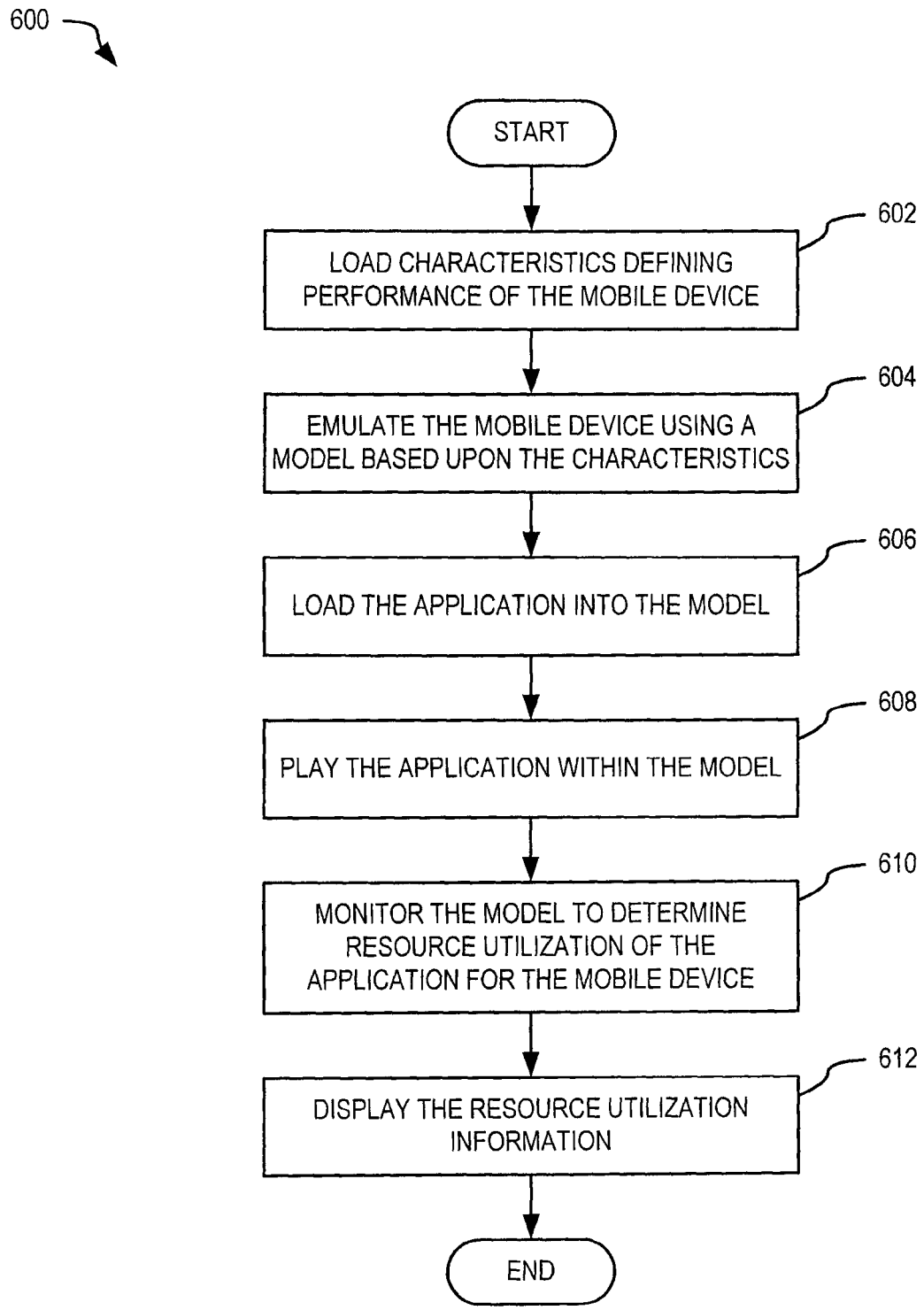
Figure 7:
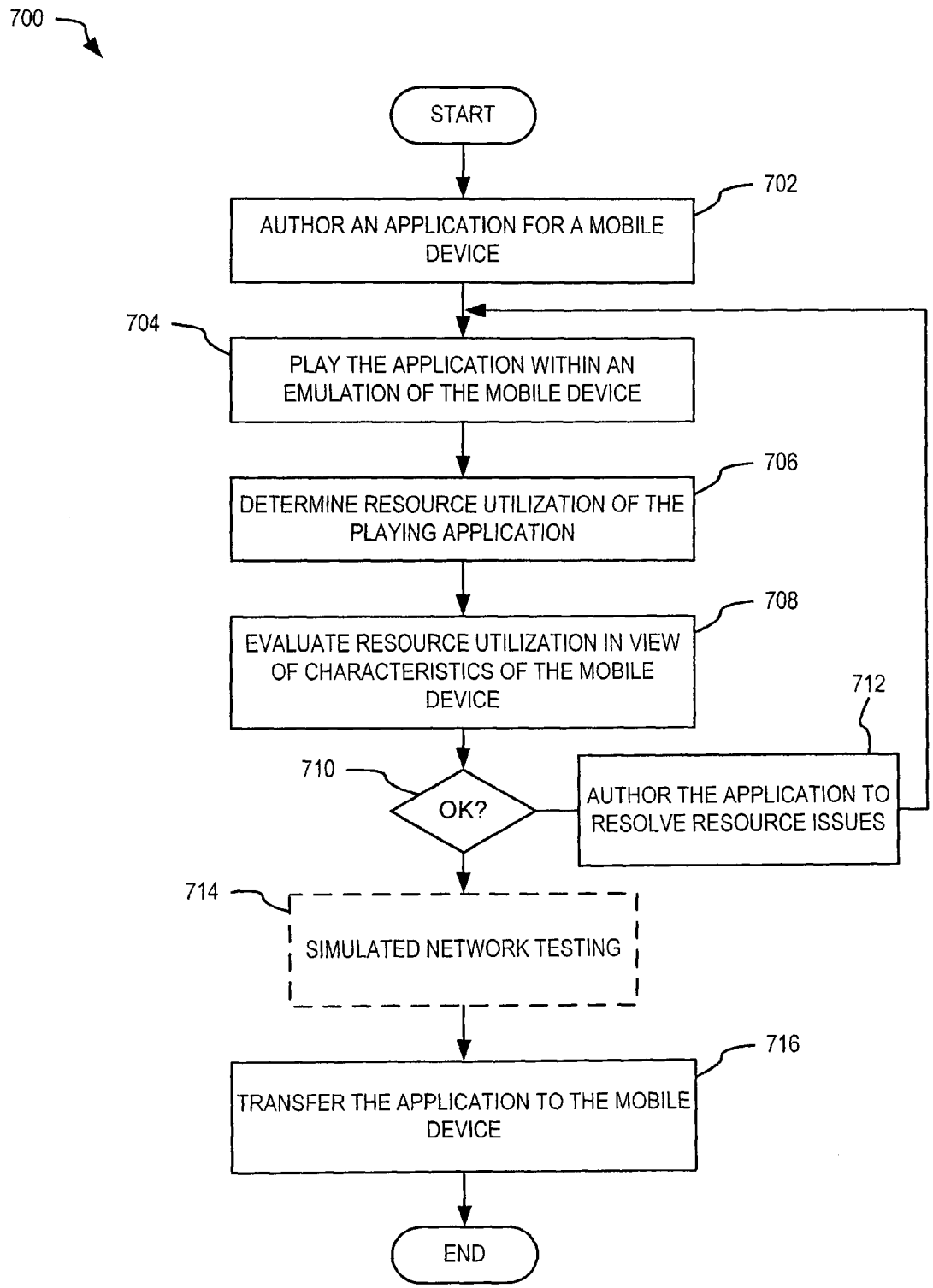
Figure 8:
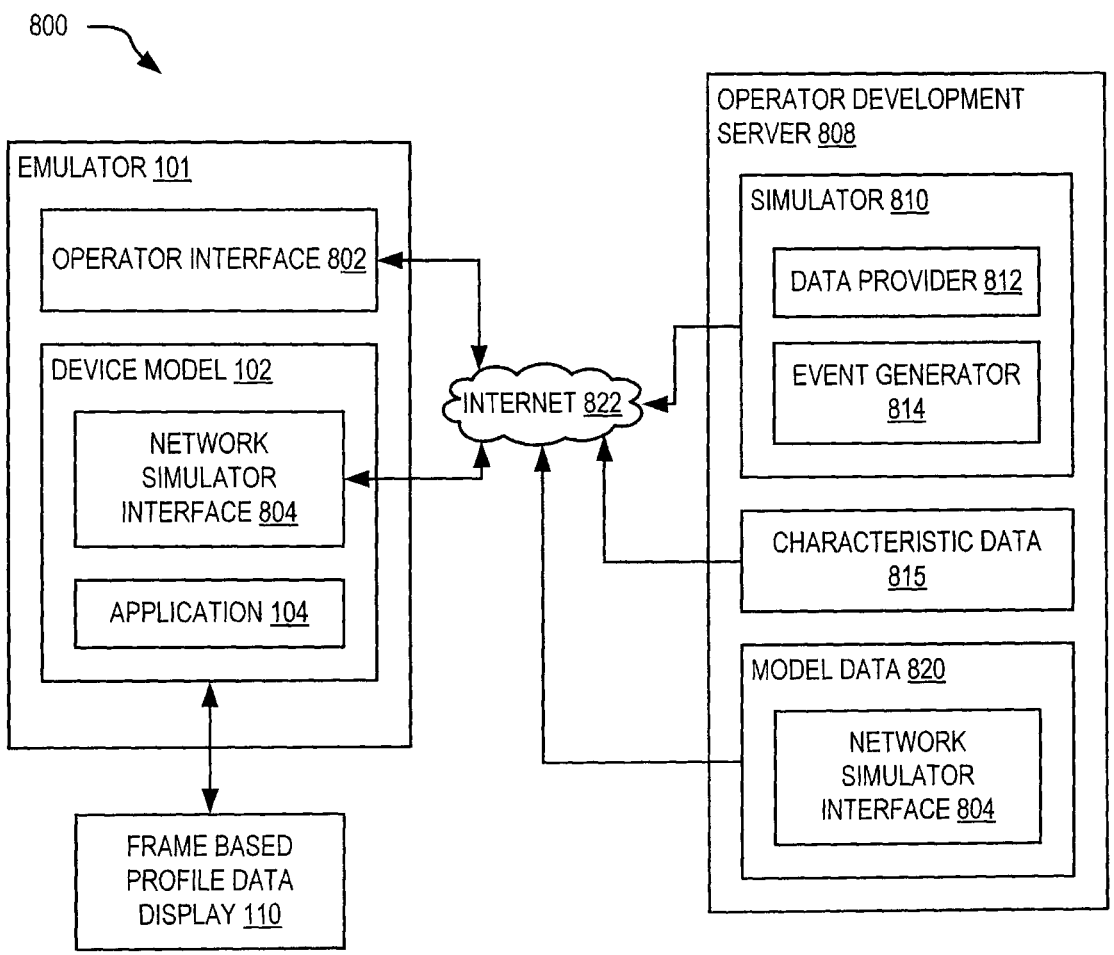
Figure 9:
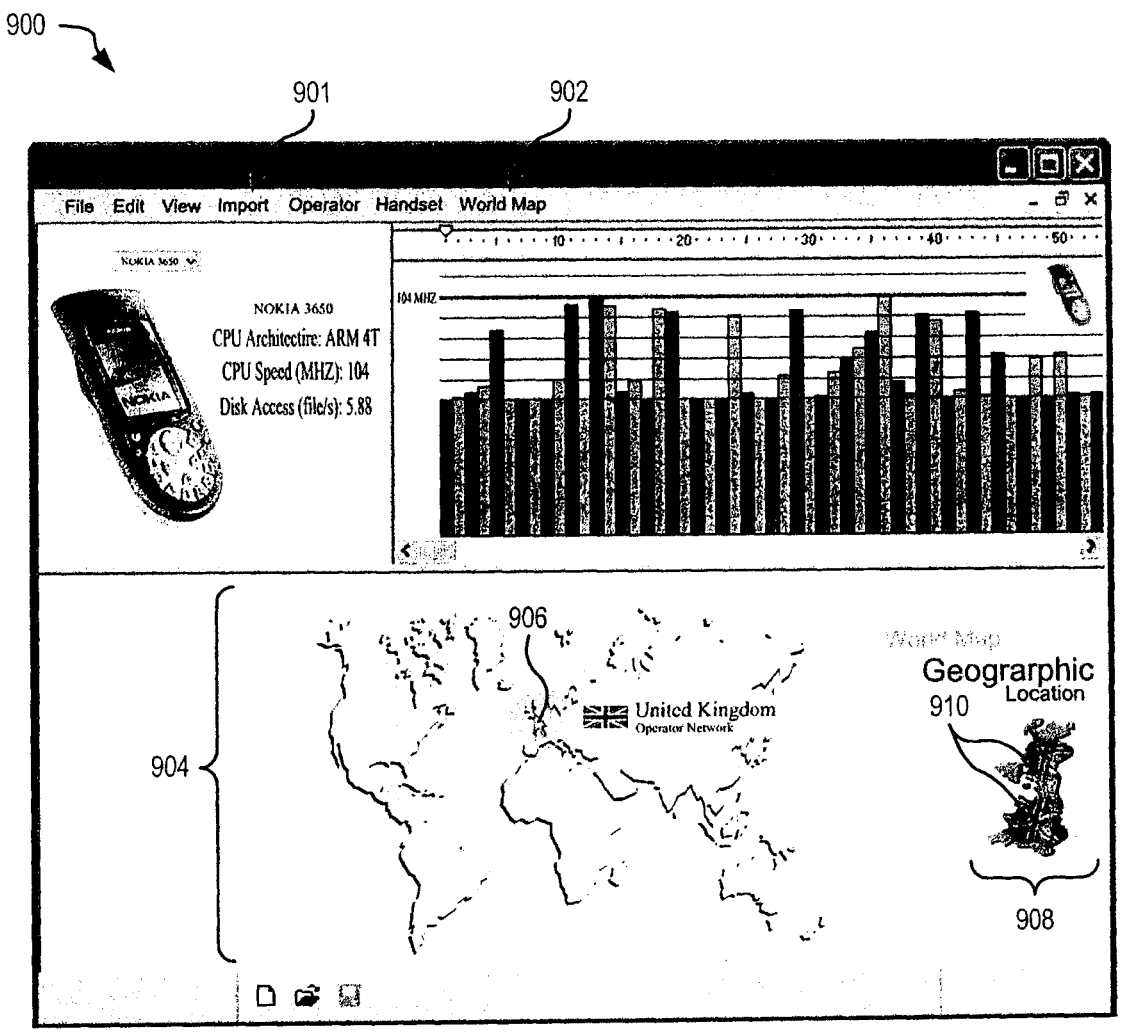
Figure 10:
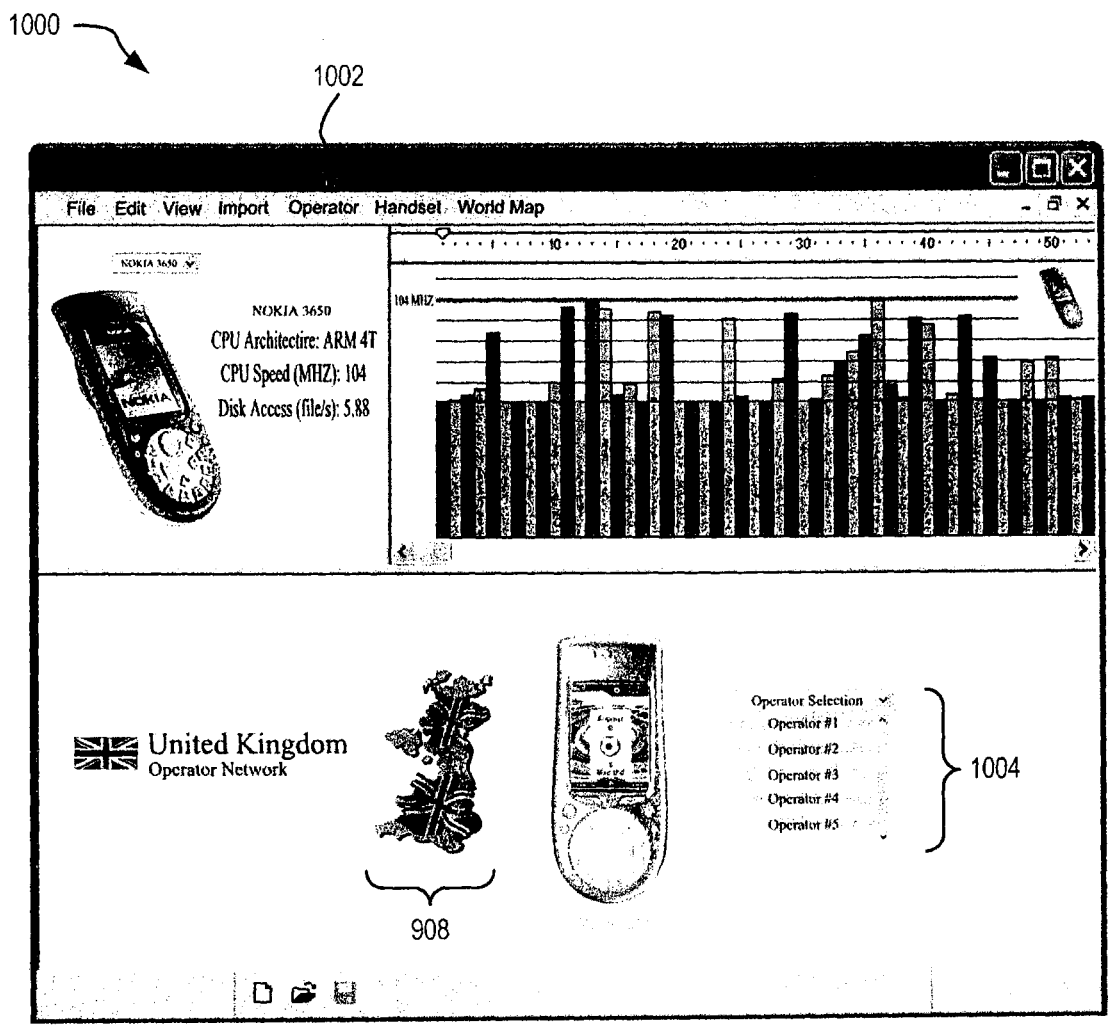
Figure 11:
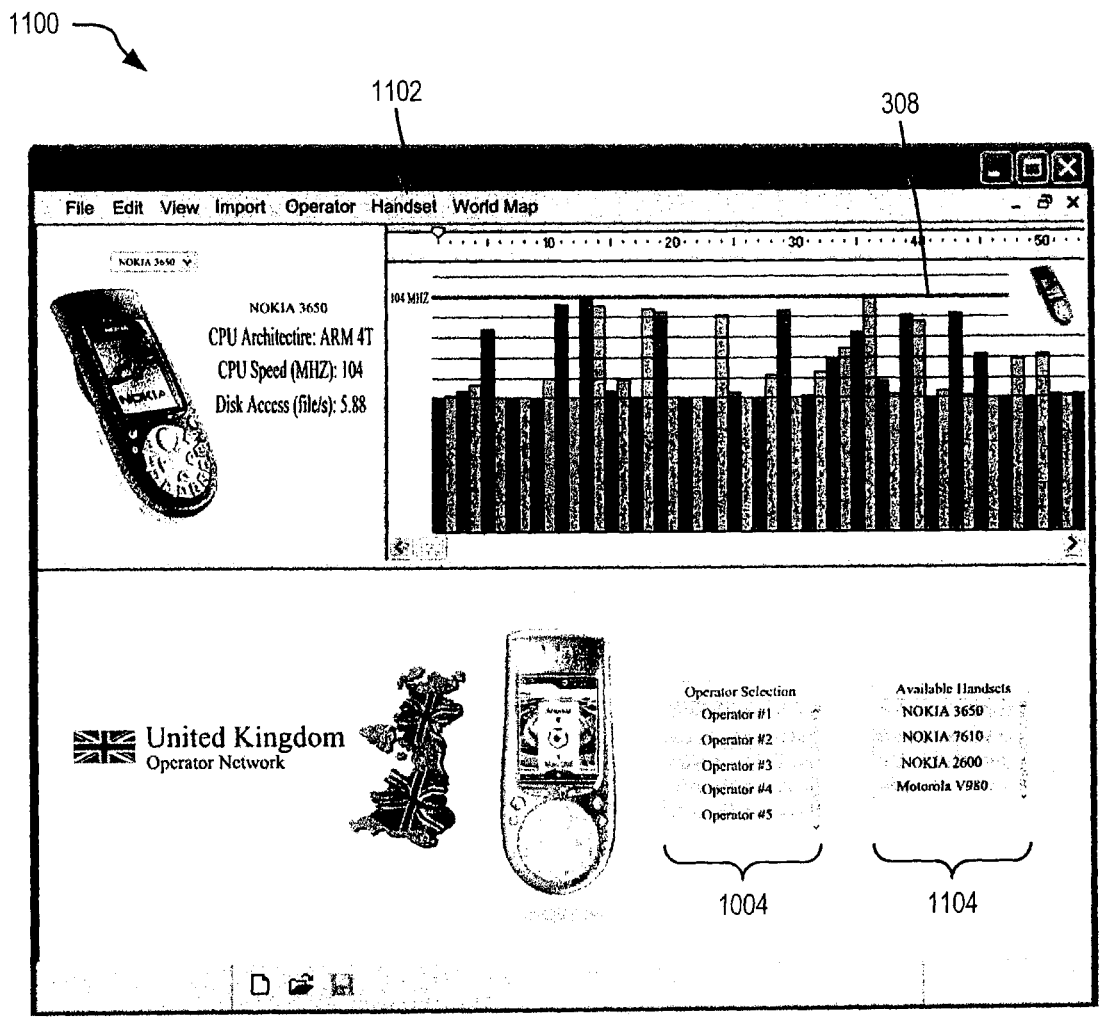
Figure 12:
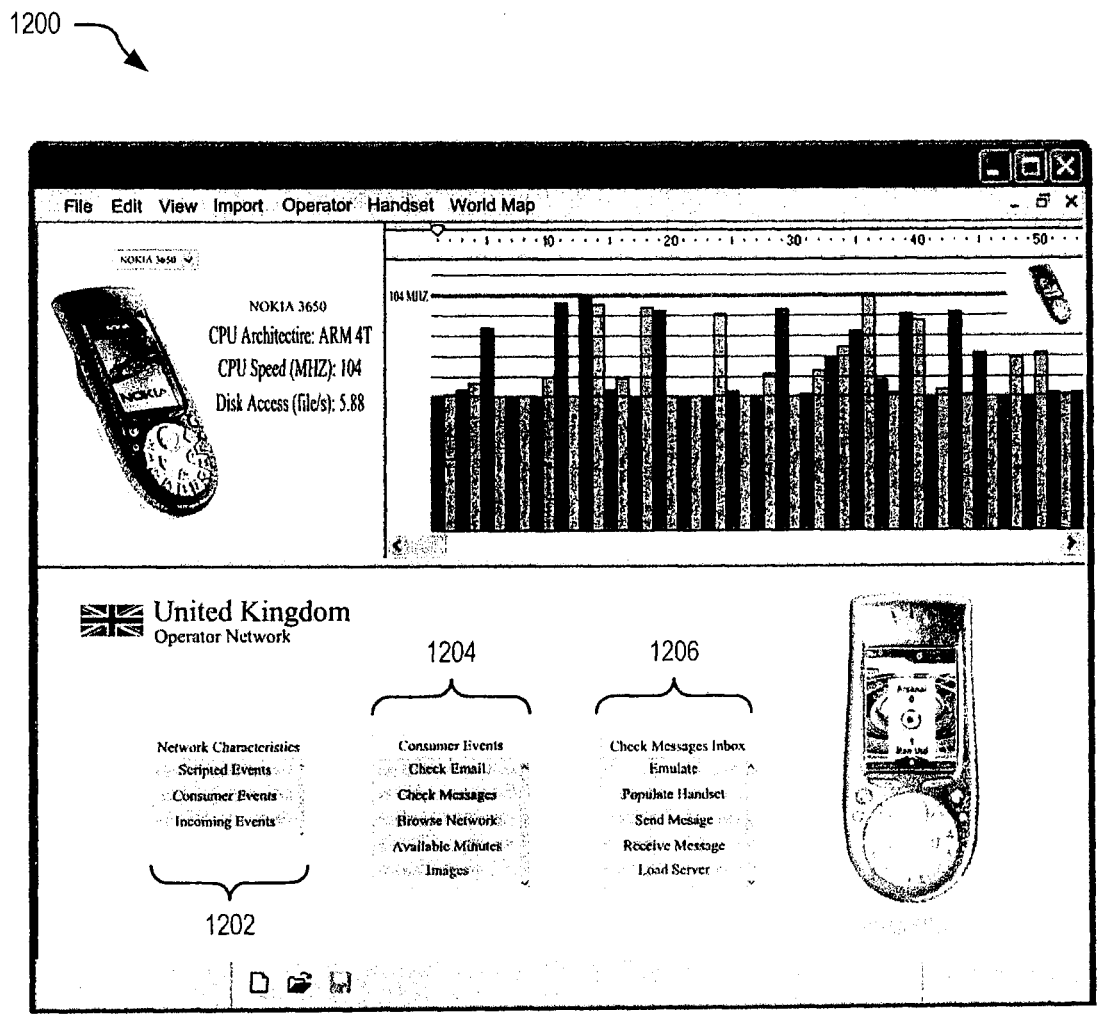
Figure 13:
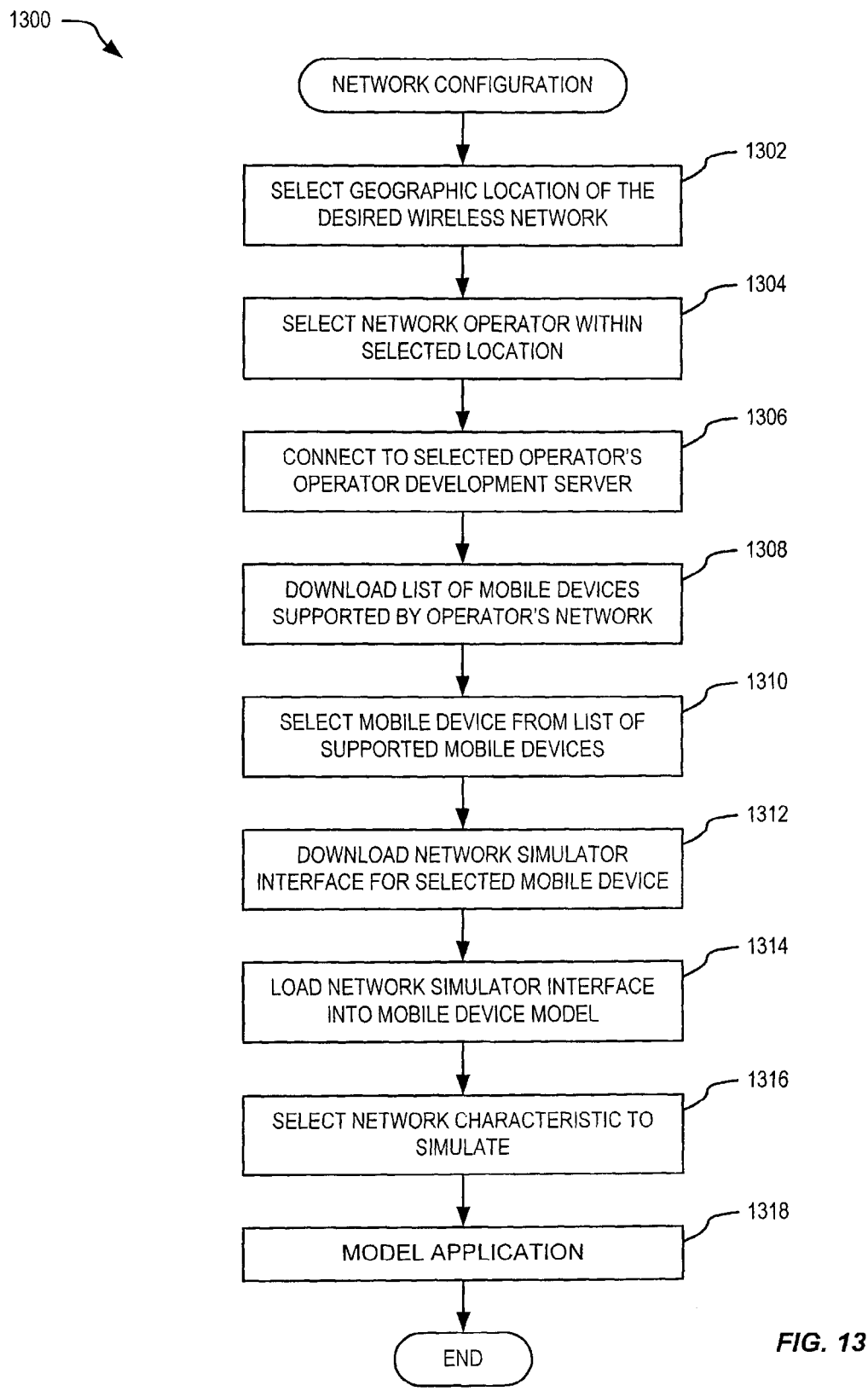
Figure 14:
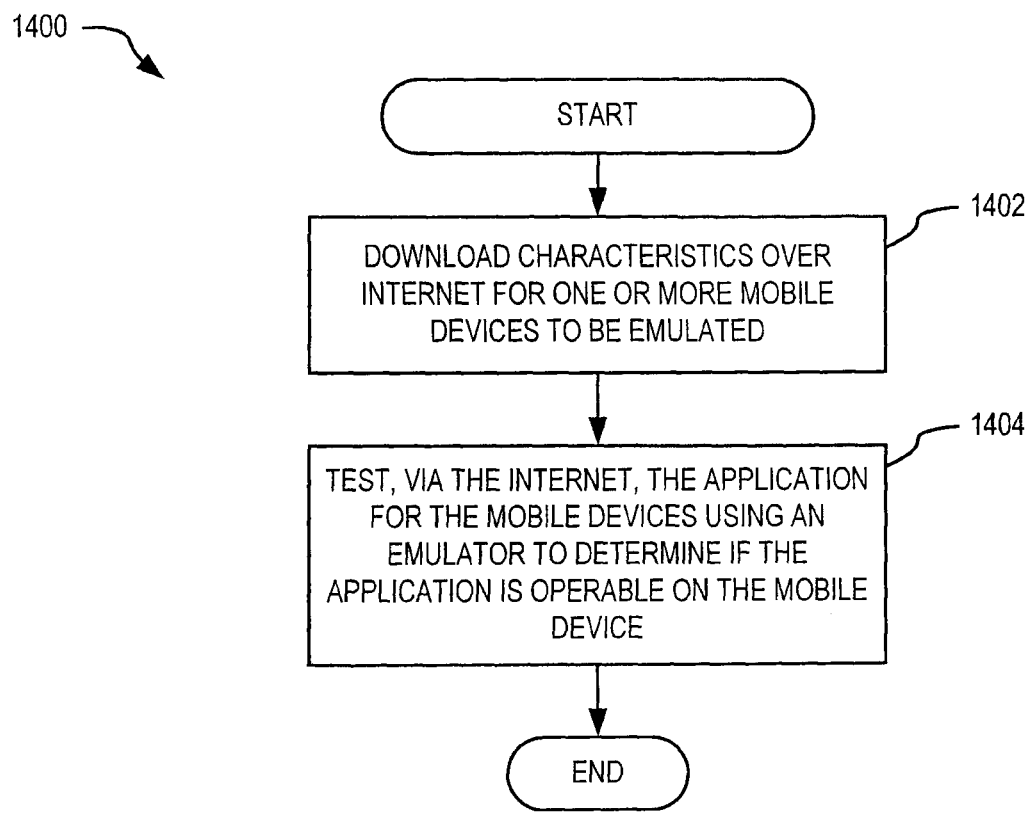

FIG. 14 is a flowchart illustrating one method for determining whether an application of a mobile device is operable. In step 1402, method 1400 downloads characteristics over Internet for one or more mobile devices to be emulated. In step 1404, method 1400 tests the application for the mobile devices, via the Internet, using an emulator to determine if the application is operable on the mobile device.

Changes may be made in the above methods and systems without departing from the scope hereof. It should thus be

What is claimed is:

1. A method for emulating an application executing in real time in a mobile device, the method comprising:
   emulating the mobile device in real time using a model running on a processor extrinsic to the mobile device, wherein the model is based on characteristics indicative of performance of the mobile device; executing the application in real time within the model;
   monitoring the application executing in the model to determine resource utilization information by the application for the mobile device; and displaying the resource utilization information for the mobile device.

2. The method of claim 1, wherein the step of displaying comprises displaying the resource utilization information graphically using a timeline indicating points in time during the execution of the application.

3. The method of claim 1, wherein step of emulating comprises:
   determining, based upon the characteristics, for the mobile device: the display size of the mobile device;
   the amount of random access memory (RAM);
   the amount of non-volatile memory; and
   the processor speed; and
   generating the model based upon one or more of the display size, the amount of RAM, the amount of non-volatile memory, and the processor type.

4. The method of claim 1, further comprising identifying one or more time points in the application where resource utilization of the application exceeds a maximum resource availability threshold of any one of the mobile devices.

5. The method of claim 4, further comprising displaying the first identified time point in the application to indicate a crash of the application on the emulated mobile device.

6. The method of claim 1, further comprising identifying one or more time points in the application where resource utilization of the application exceeds a maximum resource availability threshold of the mobile device, wherein the threshold defaults to a maximum resource availability for the emulated mobile device.

7. The method of claim 1, further comprising identifying one or more time points in the application where resource utilization of the application exceeds a maximum resource availability threshold of any one of the mobile devices, wherein the threshold is modified to dynamically adjust resource availability to the application.

8. The method of claim 1, wherein the resource utilization information is displayed relative to execution of a numbered frame.

9. A method for emulating an application executing on a mobile device comprising:
   emulating the mobile device using a model based upon performance characteristics of the mobile device;
   executing the application in real time within the model;
   monitoring the model to determine resource utilization of the application executing on the mobile device; and
   displaying the resource utilization information.

10. A method for emulating an application executing on a mobile device, the method comprising:
    emulating, on a processor extrinsic to the mobile device, the mobile device as a model based upon characteristics indicative of performance of the mobile device;
    executing the application in real time within the model;
    monitoring the application executing in the model to determine utilization of the mobile device's resources by the application;
    identifying a time point in the application where resource utilization by the application exceeds a maximum resource availability threshold of the mobile device; and
    displaying the identified time point to indicate a crash of the application on the emulated mobile device.

11. The method of claim 10, wherein the time point is displayed in terms of a numbered frame of the application.

12. A method for developing an application to execute on a mobile device, the method comprising:
    determining resource utilization of the application when executed on the mobile device by:
    emulating the mobile device on a processor extrinsic to the mobile device using a model based on characteristics indicative of performance of the mobile device;
    loading the application into the model; and
    monitoring the application executing in real time within the model to determine resource utilization of the application for the mobile device; and
    repeating the steps of receiving and determining until the resource utilization when running the application is no greater than resource availability of the mobile device.

13. A system for developing an application to execute on a mobile device comprising:
    a software authoring interface configured to simultaneously visually emulate, via one or more profile display windows, a plurality of hardware characteristics indicative of performance of the mobile device when executing the application; and
    a system information window configured to display mobile device hardware characteristics.

14. The system claim 13, wherein the one or more profile display windows are configured to display resource utilization information graphically using a timeline indicating points in time during execution of the application.

15. The system of claim 13, wherein the relative positions of maximum and minimum operational thresholds of the application are displayed in real time while the application is executing.

16. The system of claim 13, wherein the maximum and minimum operational thresholds are adjustable by a system user.

17. The system of claim 13, wherein the frame executed by the application is displayed for each of the thresholds.

18. The system of claim 13, wherein each of the windows can be docked and undocked to simultaneously display one or more of the windows.

19. The system of claim 13, further including a module configured to allow user control of at least one of the hardware characteristics via an image of the mobile device.

20. The system of claim 13, wherein the windows can be scrolled to display the contents thereof at any given position of the executing application.

21. The system of claim 13, wherein movement of a respective scroll bar enables display of a static runtime position of each of a plurality of said profile windows displaying said characteristics of the mobile device.

22. The system of claim 13, wherein the percentage CPU and memory usage of the mobile device is indicated in one of the profile windows when executing the application.

23. The system of claim 13, wherein the software authoring interface is included in an authoring environment, and wherein the authoring environment is further configured to publish the application after verification that the application does not exceed resources of the mobile device.

24. The system of claim 23, wherein the authoring environment is further configured to publish the application using an interface providing communication with the mobile device.

25. The system of claim 24, wherein the interface includes Ethernet, WiFi, Bluetooth, infrared, or combinations thereof.

26. The system of claim 13, wherein the software authoring interface is included in an authoring environment, and wherein the system further comprises a further interface configured to communicate with a server, and wherein the authoring environment is configured to allow authoring of the application based on information received from the server.

27. The system of claim 13, wherein the software authoring interface is included in an authoring environment, and wherein the system further comprises a further interface configured to communicate with a server to update the software authoring interface.

28. The system of claim 27, wherein the further interface is further configured to allow control by the server of events which impact performance of the application.

29. The system of claim 27, wherein the further interface is configured to communicate with the server in response to a user paying a subscription fee.

30. The system of claim 29, wherein the software authoring interface is configured to allow authoring of applications using data received from the server responsive to the user paying the subscription fee.

31. The system of claim 30, wherein the software authoring interface is further configured to publish the application authored using the data received from the server responsive to the user paying the subscription fee.

32. The system of claim 13, wherein the software authoring interface is further configured to simultaneously visually emulate, via one or more profile display windows, a plurality of hardware characteristics indicative of performance of another mobile device when executing the application.

33. The system of claim 13, further comprising an emulator configured to test the application, via the Internet, to determine if the application is operable on the mobile device.

* * * * *

UNITED STATES PATENT AND TRADEMARK OFFICE
CERTIFICATE OF CORRECTION

PATENT NO.       : 8,332,203 B1
APPLICATION NO.  : 12/759543
DATED            : December 11, 2012
INVENTOR(S)      : Poulin It is certified that error appears in the above-identified patent and that said Letters Patent is hereby corrected as shown below:

Please delete patent 8,332,203 B1 in its entirety and insert 8,332,203 in its entirety as attached Signed and Sealed this
Thirteenth Day of August, 2013

Teresa Stanek Rea
*Acting Director of the United States Patent and Trademark Office*

CERTIFICATE OF CORRECTION (continued)

(12) United States Patent
Poulin

(10) Patent No.: US 8,332,203 B1
(45) Date of Patent: *Dec. 11, 2012

(54) SYSTEM AND METHODS FOR AUTHORING A MOBILE DEVICE APPLICATION

(75) Inventor: Donavan Paul Poulin, Kelowna (CA)

(73) Assignee: Wapp Tech Corp., Red Deer (CA)

( * ) Notice: Subject to any disclaimer, the term of this patent is extended or adjusted under 35 U.S.C. 154(b) by 230 days.

This patent is subject to a terminal disclaimer.

(21) Appl. No.: 12/759,543

(22) Filed: Apr. 13, 2010

Related U.S. Application Data

(63) Continuation of application No. 11/449,958, filed on Jun. 9, 2006, now Pat. No. 7,813,910.

(60) Provisional application No. 60/689,101, filed on Jun. 10, 2005.

(51) Int. Cl.
 *G06F 9/455* (2006.01)
 *G06F 3/13* (2006.01)

(52) U.S. Cl. ............... 703/22; 703/13; 703/24; 703/27; 709/206; 709/246; 715/771

(58) Field of Classification Search
 USPC .......... 703/13, 24, 27; 709/206, 246; 715/771
 See application file for complete search history.

(56) References Cited

U.S. PATENT DOCUMENTS

| | | | |
|---|---|---|---|
| 5,892,794 A * | 4/1999 | Slegers | 375/219 |
| 5,937,421 A * | 8/1999 | Petrov et al. | 715/205 |
| 7,107,049 B2 | 9/2006 | Barberis et al. | |
| 7,313,772 B2 * | 12/2007 | Hekmatpour et al. | 716/106 |
| 7,546,298 B2 | 6/2009 | Hulaj et al. | |
| 7,813,910 B1 * | 10/2010 | Poulin | 703/22 |
| 2002/0188713 A1 | 12/2002 | Bloch et al. | |
| 2004/0039975 A1 * | 2/2004 | Kounik et al. | 714/741 |
| 2006/0036941 A1 | 2/2006 | Neil | |
| 2007/0005324 A1 * | 1/2007 | Gong et al. | 703/14 |
| 2007/0019769 A1 * | 1/2007 | Green et al. | 375/360 |
| 2007/0127426 A1 * | 6/2007 | Watters et al. | 370/338 |
| 2007/0142091 A1 * | 6/2007 | Gasborro et al. | 455/566 |
| 2007/0174490 A1 * | 7/2007 | Choi et al. | 709/246 |
| 2007/0288424 A1 * | 12/2007 | Neil | 707/2 |
| 2008/0313282 A1 * | 12/2008 | Warila et al. | 709/206 |
| 2010/0017185 A1 | 1/2010 | Bade et al. | |

OTHER PUBLICATIONS

Macromedia® Flash MX 2004 Professional Flash Lite User Manual, Second Edition, Aug. 2003, 22 pages.
Macromedia® Flash 8, Developing Flash Lite Application, First Edition, Sep. 2005, 94 pages.
Macromedia® Flash MX Professional 2004, Flash Lite Authoring Guidelines for the i-mode Service by NTT DoCoMo, First Edition: Mar. 2003, 48 pages.
FlashCast Add-in for Flash MX Professional 2004, Adobe®, 2009, 3 pages.

(Continued)

*Primary Examiner* — Thai Phan

(57) ABSTRACT

A system and methods emulate an application executing in real time in a mobile device. The mobile device is emulated in real time using a model running on a processor extrinsic to the mobile device. The model is based on characteristics indicative of performance of the mobile device. The application is executed in real time within the model and the application executing in the model is monitored to determine resource utilization information by the application for the mobile device. The resource utilization information for the mobile device is displayed.

33 Claims, 14 Drawing Sheets

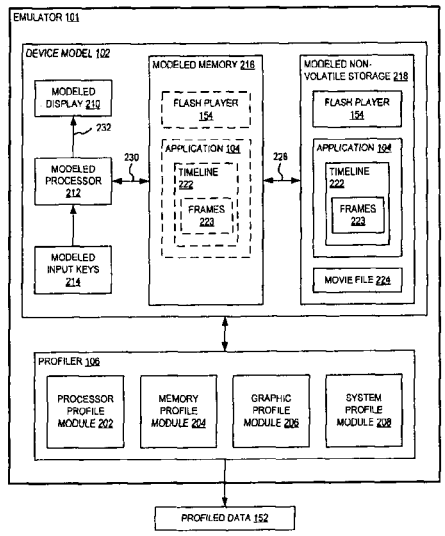

OTHER PUBLICATIONS

Macromedia® FlashCast™ FAQ, 2006, 4 pages.
Adobe®, TechNote, Unable to use a handset emulator to test Flash Lite content, Feb. 28, 2005, 1 page.
Talbot, J., Creating Flash Lite Applications, Adobe®, 2006, 38 pages.
Adobe—Developer Center: MAX Sneak Peeks, MAX 2005 Articles, Oct. 2005, 12 pages.
Case No. CV 08-4166 JL, ThinkVillage-Kiwi LLC'S Complaint and Demand For Jury Trial, Sep. 1, 2008, 12 pages.
Case No. CV 08-4166 JL, Answer of Defendants Adobe Systems, Inc. And Adobe Macromedia Software LLC to ThinkVillage-Kiwi LLC'S Complaint; Sep. 24,2008; 8 pages.
Case No. CV 08-4166 SI, Supplemental Declaration of Jakub Plichta in Support of Motion by Defendants for Summary Judgment, dated Oct. 16, 2009, 2 pages.
Campbell, R.; Adobe Systems Incorporated; letter to Dr. T.W. Stevenson dated Jan. 14, 2005; 2 pages.
Nokia, Release Note for Nokia's "Series 60 $2^{nd}$ Edition SDK for Symbian OS Supporting Feature Pack 3" dated Jun. 17, 2005—Exh. A to Case No. CV 08-4166 SI, Supplemental Declaration of Jakub Plichta in Support of Motion by Defendants for Summary Judgment dated Oct. 16, 2009, 5 pages.
Nokia, selected pages from User Manual—Series 60 $2^{nd}$ Edition SDK for Symbian OS, Supporting Feature Pack 3—Exh. B to Case No. CV 08-41166 SI, Supplemental Declaration of Jakub Plichta in Support of Motion by Defendants for Summary Judgment dated Oct. 16, 2009, 7 pages.
U.S. Appl. No. 11/449,958, Office Action mailed Jun. 1, 2009, 10 pages.
U.S. Appl. No. 11/449,958, Response to Office Action filed Jul. 17, 2009, 24 pages.
U.S. Appl. No. 11/449,958, Office Action mailed Nov. 17, 2009, 11 pages.
U.S. Appl. No. 11/449,958, Response to Office Action filed Nov. 19, 2009, 12 pages.
U.S. Appl. No. 11/449,958, Office Action mailed Dec. 3, 2009, 11 pages.
U.S. Appl. No. 11/449,958, Pre-Brief Appeal Conference Request filed Dec. 7, 2009, 6 pages.
U.S. Appl. No. 11/449,958, Pre-Brief Appeal Conference Decision mailed Feb. 9, 2010, 2 pages.
U.S. Appl. No. 11/449,958, Office Action mailed Apr. 19, 2010, 11 pages.
U.S. Appl. No. 11/449,958, Applicant Interview Request filed Apr. 22, 2010, 2 pages.
U.S. Appl. No. 11/449,958, Applicant Interview Summary filed May 6, 2010, 10 pages.
U.S. Appl. No. 11/449,958, Examiner Interview Summary mailed May 11, 2010, 4 pages.
U.S. Appl. No. 11/449,958, Examiner Interview Summary mailed May 24, 2010, 4 pages.
U.S. Appl. No. 11/449,958, Applicant Interview Summary filed Jun. 10, 2010, 3 pages.
U.S. Appl. No. 11/449,958, Examiner Interview Summary mailed Jun. 15, 2010, 4 pages.
U.S. Appl. No. 11/449,958, Amendment and Response to Examiner Interview Summary filed Jun. 15, 2010, 8 pages.
Compuware, "Windows CE Development, Testing and Tuning", Compuware NuMega, date unknown.
De Herrera, , "Windows Mobile 5.0 Emulator", 2005.
Harrison, et al., "Appendix 4: Emulator Reference", Symbian OS for Mobile Phones, 2003.
Kane Computing, LTD, "Code Composer Studio Development Tools v3.1", Getting Started Guide, Texas Instruments, May 2005.
Knudsen, "New Features in the J2ME Wireless Toolkit 1.0.4", Jun. 2002.
Knudsen, et al., "New Features in the J2ME Wireless Toolkit 1.0.4", http://developers.sun.com, Jun. 2002.
Li, et al., "Beginning J2ME: From Novice to Professional", 3rd Edition.
Maas, , "Using Palm OS Emulator", www.palmos.com/dev/support/docs/, Mar. 2002.
Morrison, "Wireless Java with J2ME", InformIT, Jun. 17, 2001, 576.
Morrison, Michael "Getting to Know the J2ME Emulator", J2ME Emulator Essentials, Aug. 17, 2001.
Motorola, "iDEN Development and Runtime Utilities", Motorola, 2005.
Nokia, "Series 60 Developer Platform: Debugging Software with Borland C++ BuilderX", Forum Nokia; Version 1.0, Jan. 12, 2004.
Openwave, "Getting Started", Openwave Systems, Inc, Jun. 2002.
Research in Motion LTD, "BlackBerry Java Development Environment", Developer Guide vol. 1, Version 3.6, 2003.
Research in Motion LTD, "BlackBerry Simulator", User Guide, Version 3.6, Apr. 10, 2003.
Satoh, "A Testing Framework for Mobile Computing Software", IEEE Computer Society, IEEE Transactions on Software Engineering; vol. 29 No. 12, Dec. 2003.
Stevenson, "Code Composer Studio IDE v3 White Paper", Jul. 2004.
Sun Java System, "J2EE 1.4 Platform", NetBeans, May 2005.
Sun Microsystems, "J2ME Wireless Toolkit", User's Guide, Version 2.2, Oct. 2004.
Sun Microsystems, "White Paper on KVM and the Connected, Limited Device Configuration (CLDC)", J2ME Building Blocks for Mobile Devices, May 19, 2000.
Symbian, "EPOC Emulator", 1997.
Taylor, Michael "J2ME IDE Comparison", Development Consulting Limited Version 1.1, Jun. 29, 2002.
Texas Instruments, "Code Composer Studio v3.0", Getting Started Guide, Sep. 2004.
Texas Instruments, "Code Composer Studio v5", Texas Instruments Embedded Processors Wiki, 2004.
Yuan, "Developing J2ME Applications with EclipseME", IBM, Nov. 30, 2004.

* cited by examiner

SYSTEM AND METHODS FOR AUTHORING A MOBILE DEVICE APPLICATION

RELATED APPLICATIONS

This application is a continuation of U.S. patent application Ser. No. 11/449,958, filed Jun. 9, 2006 now U.S. Pat. No. 7,813,910, which claims priority to U.S. Patent Application Ser. No. 60/689,101 filed Jun. 10, 2005. Both of the aforementioned applications are incorporated herein by reference.

BACKGROUND

It is estimated that the mobile market is evolving at five times the speed of the eCommerce market. It is estimated that nearly 700 million new mobile devices will be shipped in 2005, with a new handset model being launched every other day. This rapid mobile device development requires that applications designed to run on these mobile devices also sustain rapid development. Development systems targeted at one mobile device may become obsolete and possibly of little value to the developer at the time it is shipped as well as development life cycles.

Many new mobile devices include a display management engine called a Flash Player; one example of a Flash Player suitable for mobile devices is FlashLite, developed by Macromedia. The Flash Player provides a common application platform for playing applications on the mobile devices and allows developers to develop applications that may be played on multiple mobile devices that include the Flash Player. Applications for mobile devices are typically developed on a personal computer (PC) or workstation and target one or more types of mobile device that include a Flash Player. These applications require real-time testing of the application on all applicable mobile devices. Although a Flash Player application may operate correctly on one mobile device model, it may crash when playing on a different mobile device model. For example, a NOKIA 6600 has a 16% reduction in ARM CPU speed and available memory resources compared to a NOKIA 7610, thus an application that plays correctly on the NOKIA 7610 may not play correctly on the NOKIA 6600 due to this drop in inherent resources.

Development packages (e.g., FlashMX by Macromedia) are available to run on a PC and allow development of Flash Player applications for one or more mobile devices. However, although these development packages may simulate operation of the application playing on the targeted mobile device, they do not determine if the application will play correctly on the targeted mobile device based upon resource usage. Currently, the only way to determine if an application plays on a particular mobile device is to transfer the application to the device and play it. During development of an application for a mobile device, an application author may transfer and play the application hundreds of times (development life cycles) on the targeted mobile device before identifying and correcting all system resource problems within the application. Where an application is targeted to play on many types of mobile device, it must be transferred and tested on a mobile device representative of each targeted mobile device type. This transferring and testing process is time-consuming and therefore costly for the application author.

Further, having accessibility to all available mobile devices in targeted geographical markets worldwide as well as real-time interaction with network Operators to measure and emulate network characteristics within each market is presently not possible.

SUMMARY OF THE INVENTION

In one embodiment, a method emulates and profiles an application to play on a mobile device that includes a Flash Player. Characteristics defining performance of the mobile device are loaded. The mobile device is emulated using a model based upon the characteristics. The application is played and monitored within the model to determine resource utilization of the application for the mobile device.

In another embodiment, a method authors, emulates and profiles an application to play on a mobile device that includes a Flash Player. The application is authored using an application development tool and the mobile device is emulated using a model based upon the characteristics. The application is played within the model and the model is monitored to determine resource utilization of the application for the selected mobile device.

In another embodiment, a method authors an application to play on a mobile device that includes a Flash Player. The application is authored using an application development tool. Resource utilization of the application for the mobile device is estimated. The steps of authoring and estimating are repeated until the resource utilization is less than or equal to the resources available on the mobile device.

In another embodiment, a software product has instructions, stored on computer-readable media, wherein the instructions, when executed by a computer, perform steps emulating and profiling an application to play on a mobile device that includes a Flash Player, including: instruction for loading characteristics defining performance of the mobile device; instruction for emulating the mobile device using a model based upon the characteristics; instruction for playing the application within the model; and instruction for monitoring the application playing in the model to determine resource utilization of the application for the mobile device.

In another embodiment, an emulator profiles an application of a mobile device that includes a Flash Player, including: means for generating a model of the mobile device based upon mobile device characteristics, and means for playing the application within the model to determine resource utilization of the application when played by the mobile device.

In another embodiment, a method determines whether an application of a mobile device is operable. Characteristics are downloaded over Internet for one or more mobile devices to be emulated and the application for the mobile devices is tested, via the Internet, using an emulator to determine if the application is operable on the mobile device.

BRIEF DESCRIPTION OF THE FIGURES

FIG. 1A shows one exemplary embodiment of a system for emulating, authoring and visually profiling an application playing on a mobile device that includes a Flash Player.

FIG. 1B shows one exemplary embodiment of the system of FIG. 1A within a computer.

FIG. 2 is a block diagram illustrating detail of an emulator of the system of FIGS. 1A and 1B.

FIG. 3 is a display showing one exemplary frame based profile graph.

FIG. 4 is a display showing the modeled mobile device of FIGS. 1A and 1B.

FIG. 5 shows one exemplary window that includes the display of FIG. 3, the display of FIG. 4 and an exemplary user interface.

FIG. 6 is a flowchart illustrating a method for modeling and profiling an application to play on a mobile device that includes a Flash Player.

FIG. 7 is a flowchart illustrating one method for authoring, emulating and profiling an application to play on a mobile device that includes a Flash Player.

FIG. 8 is a block diagram illustrating the emulator of FIG. 1 interacting with an operator development server via the Internet for simulating playing of the application within a mobile device connected to a wireless network.

FIGS. 9, 10, 11 and 12 show exemplary user interface screens for interacting with the emulator of FIG. 1 to configure and test operation of the application within the model of the mobile device when connected to a wireless network.

FIG. 13 is a flowchart illustrating one exemplary method for configuring network simulation.

FIG. 14 is a flowchart illustrating one method for determining whether an application of a mobile device is operable.

DETAILED DESCRIPTION OF THE FIGURES

FIG. 1A shows one exemplary embodiment of a system 100 for emulating and profiling a frame based application 104 playing on a mobile device 114 that includes a Flash Player 116. System 100 is shown with an emulator 101, a profiler 106 and a display 110. Emulator 101 generates a mobile device model 102, based upon mobile device characteristics 115 of mobile device 114. Model 102 emulates mobile device 114 to play frame based application 104 and may, for example, generate an emulated mobile device display 111 that represents mobile device 114. Emulated mobile device display 111 may be interactive to allow a user to interact (in a manner similar to interacting with device 114) with application 104 while playing within model 102.

Profiler 106 monitors playing of frame based application 104 within model 102 to estimate resource usage of application 104 and generates a frame based profile data display 110. Frame based profile data display 110 may allow a user of system 100 to identify areas within application 104 that would exceed resources of mobile device 114.

Application 104 may be developed using a frame based application development tool 112 (indicated in dashed outline). Frame based application development tool 112 may, for example, represent Flash MX or Studio 8 from MacroMedia (now Adobe Systems). Once the user of system 100 has verified that application 104 does not exceed resources of mobile device 114, development tool 112 may be instructed to publish application 104 to device 114, as shown.

In one example of operation, development tool 112 is used to develop frame based application 104. Application 104 is transferred to emulator 101 for playing within mobile device model 102 to estimate resource usage of application 104 when played on mobile device 114. Upon playing application 104 within model 102, emulator 101 utilizes profiler 106 to determine resource utilization of application 104 based upon mobile device characteristics 115.

In one embodiment, emulator 101 is integrated with flash development tool 112 to form an authoring environment 122 that facilitates development and testing of application 104 without the need to continually load application 104 into mobile device 114.

In another embodiment, emulator 101 is an add-in module that may be configured to operate within flash development tool 112.

Mobile device 114 is shown with Flash Player 116, display 118 and input keys 120. In one embodiment, Flash Player 116 is FlashLite™ from Macromedia™ (Adobe Inc). Mobile device 114 may, for example, represent one of: a cell phone, a personal digital assistant (PDA), an interactive home appliances and other such devices. In one example, display 118 represents a color liquid crystal display (LCD) device for displaying text and images to a user of mobile device 114 and input keys 120 represent buttons that allow the user to interact with mobile device 114.

FIG. 1B shows one exemplary embodiment of system 100 within a computer 130. Computer 130 includes memory 132, storage 134 and a processor 136. Memory 132 is for example random access memory (RAM) and storage 134 is for example a disk drive or other non-volatile storage media.

Storage 134 is shown with emulator 101, mobile device characteristics 115 and application 104. Storage 134 may also include development tool 112, if desired, for developing application 104. Emulator 101 includes model algorithms 148 and profiler 106. Model algorithms 148 represent one or more algorithms that operate to generate mobile device model 102 to emulate mobile device 114 while executing application 104. Specifically, model algorithms 148 define operation of mobile device 114 based upon mobile device characteristics 115.

TABLE 1

Mobile Device Characteristics

| Parameter | Value |
| --- | --- |
| Name | NOKIA 3650 |
| Processor | ARM 4T |
| Processor Speed | 104 MHz |
| Storage Access Speed | 5.88 files/second |
| RAM Size | 256 MB |
| Storage Size | 512 MB |
| Display Width | 256 |
| Display Height | 394 |
| Pixel Depth | 24 |
| Processor Availability | 60% |
| RAM Availability | 60% |
| Storage Availability | 40% |

Table 1 Mobile Device Characteristics shows exemplary characteristics that may be used to specify performance of model 102 to emulate mobile device 114. For example, in Table 1, the characteristics have the following meaning: 'Processor' specifies the type of the processor in mobile device 114; 'Processor Speed' specifies the clocked speed of the processor within device 114; 'Storage Access Speed' specifies the rate at which data can be moved from storage to memory and/or screen within device 114; 'RAM Size' specifies the size of the RAM in mobile device 114; 'Storage Size' specifies the size of the non-volatile memory in mobile device 114; 'Display Width' specifies the number horizontal pixels on display 118 of device 114; 'Display Height' specifies the number of vertical pixels of display 118; 'Pixel Depth' specifies the number of bits per pixel (e.g., the color depth) of display 118; 'Processor Availability' specifies the percentage of processing resource available for use by applications (e.g., where mobile device 114 represents a cell phone, the phone has to maintain 'phone' operations while running any applications, thus there may only be a portion of the maximum processing resource available to applications); 'RAM Availability' specifies the percentage of RAM available to applications; and 'Storage Availability' specifies the percentage of non-volatile storage space available to applications.

Table 1 may be represented as a data structure (e.g., shown as mobile device characteristics 115 within storage 134) and may be stored in a file (not shown) or a database (not shown) within storage 134, or stored remotely. System 100 may include mobile device characteristics (e.g., mobile device characteristics 115) for multiple devices (e.g., device 114). For example, characteristics 115 may be included for each mobile device type targeted by application 104. A user of system 100 may then select one or more target mobile devices from a list based upon available characteristics 115. As appreciated, additional or fewer characteristics may be included within characteristics 115 to specify performance of mobile device 114 without departing from the scope hereof.

As new mobile device types are created, additional mobile device characteristics 115 may be easily created to specify the performance of the new device types, allowing application development to start before a physical mobile device is available. For example, if a company introduces a new series of six mobile phone handsets, six additional mobile device characteristics 115 may be created based upon measured (e.g., by running benchmarks on the new handsets or prototype) or determined (e.g., by estimating performance based upon previous models) performance thereby allowing emulation and evaluation of applications targeting these new devices.

In one embodiment, mobile device characteristics 115 may be supplied with a device model specific to one mobile device. For example, a manufacturer may supply a combined device model and characteristics for each mobile device 114. Emulator 101 may then utilize the combined device model as device model 102.

In one example, computer 130 may include an interface (not shown) that provides communication with mobile device 114 via one or more of: USB, Ethernet, infra-red, Bluetooth, WiFi and other similar communication media. This interface may, for example, allow application 104 to be deployed on mobile device 114 for final testing of application 104.

In one example of operation, processor 136 loads at least part of emulator 101 into memory 132 for execution. Emulator 101 then generates mobile device model 102, based upon characteristics 115, within memory 132. Emulator 101 then loads and plays application 104 within model 102. Emulator 101 may load all or part of profiler 106 into memory 132 to monitor resources and/or performance of application 104 within model 102. Specifically, as application 104 is played (i.e., utilizing a Flash Player 154) within model 102, profiler 106 monitors and records, as profiled data 152, resources utilized by application 104. Profiled data 152 may be stored (as shown in dashed outline) within storage 134 and/or displayed as frame based profile data 110 on display 140 of terminal 138. In particular, frame based profile data 110 may be used to identify areas within application 104 where upon playing of application 104 within mobile device 114, performance of mobile device 114 would be stressed. Thus, areas where failure may occur within application 104 may be identified prior to running application 104 on mobile device 114. For example, emulator 101 may display all or part of profile data 152 on display 140 to facilitate development of application 104.

FIG. 2 is a block diagram illustrating emulator 101 of FIGS. 1A and 1B in further detail. In particular, profiler 106, within emulator 101, is shown with a processor profile module 202, a memory profile module 204, a graphic profile module 206 and a system profile module 208. Processor profile module 202 may, for example, estimate processor utilization of application 104 within model 102. Memory profile module 204 may, for example, estimate memory utilization by application 104 within model 102. Graphic profile module 206 may, for example, estimate utilization of 3D fill rate and 3D polygon count of application 104 within model 102. System profile module 208 may, for example, determine overall system utilization of application 104 within model 102. More or fewer profile modules may be included within profiler 106 without departing from the scope hereof.

Device model 102, within emulator 101, has a modeled display 210, a modeled processor 212, modeled input keys 214, modeled memory 216 and modeled non-volatile storage 218. In this example, modeled display 210 represents display 118 of mobile device 114, FIG. 1, processor 212 represents a processor (not shown) of mobile device 114, modeled input keys 214 represent input keys 120 of mobile device 114, modeled memory 216 represents memory (e.g., RAM) of mobile device 114 and modeled non-volatile storage 218 represents non-volatile storage (e.g., flash memory, disk drive storage) of mobile device 114. Fewer or more elements and/or components of mobile device 114 may be modeled within device model 102 without departing from the scope hereof.

Modeled non-volatile storage 218 is shown with Flash Player 154 that may be the same as, or similar to, Flash Player 116, FIG. 1. In one example, Flash Player 154 has similar operation to Flash Player 116, but includes modifications that facilitate monitoring of application 104 within model 102 by profiler 106.

Flash applications are based upon a timeline of frames that may include graphical information and action scripts, FS Commands, network protocols, selected frame rate, etc. Flash Player 116 within mobile device 114 thus operates upon a time line of frames within application 104 to provide graphical displays (e.g., animations, rich media content) upon display 118. Accordingly, profiled data 152 may also be based upon the timeline and frames of application 104 and displayed (e.g., frame based profile data 110) as resource utilization related to one or more of: timeline, frames and processing performance of action scripts.

In FIG. 2, application 104 is shown with a timeline 222 that includes frames 223. Each frame of frames 223 may include graphics and/or action scripts that generate the graphical image for display. For example, an action script may reference one or more graphic files (e.g., movie file 224) to provide graphical images for display 111. Where each frame of frames 223 includes multiple graphic elements and/or action scripts that involve image manipulation (e.g., retrieving data from non-volatile storage, Avatar manipulations, animations, etc.), each frame may require differing resources in order to display correctly. For example, where a frame includes Avatar (e.g., an animated character) manipulation, a certain amount of processor resource is required, whereas a frame that is based upon movie file 224 may simply require data transfer time. If mobile device 114 has insufficient processor resources (e.g., because the animation is too complex for the targeted mobile device), application 104 may crash (i.e., cease to function correctly). Thus, it is important to determine the 'stress' applied by application 104 to resources of mobile device 114.

In one example of operation, Flash Player 154 plays application 104 within model 102. In particular, player 154 processes frames 223 of application 104 based upon ordering of timeline 222. One or more profiler modules 202, 204, 206 and 208 within profiler 106 monitor resource utilization of each frame, storing results as profiled data 152. Profiled data 152 is then displayed as frame based profile data 110 on display 140 for review by the user. Profile data 152 may be displayed in real time as application 104 is played within model 102. Alternatively, the user may scroll through profile data 152 as desired by interacting with data display 110. Alternatively, profile data 152 may be output as a report (not shown). The user interacts with emulated mobile device display 111 to control application 104 as if application were running on device 114.

FIG. 3 shows one exemplary display 300 showing a frame based display of profiled data 152, FIG. 1A, determined by processor profile module 202. In particular, display 300 is shown with a time line 302 that represents timeline 222 of application 104. In this example, each bar 304 indicates processor resource utilization for certain frames 223 of application 104. During play of application 104 within model 102, a current position indicator 306 shows the frame (i.e., frame 1 in this example) currently displayed by emulated mobile device display 111 (see FIG. 4). A capacity line 308 (capout) indicates the maximum processor resource available to application 128. Where bars 304 rise above capacity line 308 at locations 310, resource utilization for indicated frames of application 104 exceed the available processor resources of mobile device 114; thus application 104 may 'capout' or crash when playing those frames. Display 300 clearly displays processor resource utilization by frame 223 of application 104, thereby facilitating assimilation of stresses applied to mobile device 114 when playing application 104.

Other profile modules 204, 206 and 208, may have similar displays that clearly indicate resource utilization during playing of application 104 within model 102, thereby estimating resource utilization of application 104 when played within mobile device 114.

FIG. 4 shows one exemplary display 400 generated from device model 132 within emulator 120, FIG. 1. In particular, display 400 shows an image (e.g., generated from a bitmap of mobile device 114) of mobile device 114 with a display area 402 and input keys 404. Display 400 allows the user to see and interact with an application running within device model 132. For example, display area 402 may represent display 118 of mobile device 114 and input keys 404 may represent input keys 120 of mobile device 114.

FIG. 5 shows one exemplary window 500 that includes display 300 of FIG. 3 and display 400 of FIG. 4 and an exemplary user interface. In particular, window 500 shows selection of a mobile device (i.e., NOKIA 3650 in this example) from a pull-down list 502 that results in display of characteristics 504 of the selected mobile device. Characteristics 504 may represent characteristics 115 of FIG. 1A, for example. Window 500 facilitates interaction with model 102 through display 400 and monitoring of resource utilization of application 104 through window 300. Further, pull-down list 502 allows easy selection of further mobile devices upon which application 104 is to be profiled.

FIG. 6 is a flowchart illustrating a method 600 for modeling and profiling an application playing on a mobile device that includes a Flash Player. Method 600 may, for example, be implemented within emulator 101.

In step 602, method 600 loads characteristics defining performance of the mobile device. In one example of step 602, a user of window 500 selects a mobile device using pull-down list 502 and emulator 101 loads mobile device characteristics 115 into memory 132.

In step 604, method 600 emulates the mobile device using a model based upon the characteristics. In one example of step 604, emulator 101 generates device model 102 based upon mobile device characteristics 115.

In step 606, method 600 loads the application into the model. In one example of step 606, emulator 101 loads application 104 into device model 102.

In step 608, method 600 plays the application within the model. In one example of step 608, emulator 101 plays application 104 within model 102.

In step 610, method 600 monitors the application playing in the model to determine resource utilization of the application for the mobile device. In one example of step 610, emulator 101 utilized profiler 106 to monitor application 104 playing within model 102 to determine profiled data 152.

In step 612, method 600 displays the resource utilization information. In one example of step 612, emulator 101 displays all or part of profiled data 152 as frame based profile data 110 on display 140.

FIG. 7 is a flowchart illustrating one method 700 for authoring, emulating and profiling an application to play on a mobile device that includes a Flash Player. Method 700 may be implemented within emulator 101, for example.

In step 702, method 700 authors an application for a mobile device. In one example of step 702, a user interacts with frame based application development tool 112 to author application 104.

In step 704, method 700 plays the application within an emulation of the mobile device. In one example of step 704, emulator 101 generates model 102 based upon characteristics 115 of mobile device 114 and then loads and plays application 104 within model 102.

In step 706, method 700 determines resource utilization of the playing application. In one example of step 706, emulator 101 utilizes one or more profile modules 202, 204, 206 and 208 of profiler 106 to determine resource utilization of application 104 within model 102 and stores the resource utilization information as profiled data 152.

In step 708, method 700 evaluates resource utilization in view of characteristics of the mobile device. In one example of step 708, emulator 101 evaluates profiled data 152 to determine, based upon characteristics 115, if resource utilization is within available resources of mobile device 114.

Step 710 is a decision. If in step 710, method 700 determines that the resource utilization of step 708 is within available resources of mobile device 114 (i.e., OK), method 700 continues with step 714; otherwise method 700 continues with step 712.

In step 712, method 700 authors the application to resolve resource issues. In one example of step 712, the user modifies application 104, based upon determined resource utilization of step 708, using development tool 112. Method 700 continues with step 704. Steps 704 though 712 thus repeat until the estimated resources requirement of the application is within available resources of the mobile device.

Step 714 is optional and is particularly suited for testing applications (e.g., application 104) running on a mobile device (e.g., mobile device 114) that is a mobile phone. In step 714, emulator 101 interacts with one or more operator development servers (e.g., operator development server 808, FIG. 8) to configure device model 102 for simulated network operation to allow testing of application 104 within a simulated wireless network environment (e.g., a simulated mobile phone wireless network environment). Simulated network operation is described in further detail below and shown in FIGS. 8 though 13.

In step 716, method 700 transfers the application to the mobile device. In one example of step 716, emulator 101 instructs development tool 112 to publish application 104 to mobile device 114.

FIG. 8 is a block diagram illustrating interaction of emulator 101 with an operator development server 808 via Internet 822 for simulating playing of application 104 within a mobile device connected to a wireless network (e.g., a mobile phone wireless network). FIGS. 9, 10, 11 and 12 show exemplary windows that allow a user to interact with emulator 101 for configuring and testing operation of application 104 within model 102 when simulating connection to a wireless network. FIGS. 8, 9, 10, 11 and 12 are best viewed together with the following description.

Emulator 101 is shown with an operator interface 802 that interacts with operator development server 808 via Internet 822. Internet 822 may, for example, represent the world wide web (WWW), an Intranet or any fixed or wireless server connection. Operator development server 808 is shown with a simulator 810, characteristic data 815 and model data 820. Model data 820 may, for example, represent live network profiles. To facilitate connection to operator development server 808, a user of emulator 101 purchases a subscription from a provider of operator development server 808 (or from a third party) that allows emulator 101 to connect to operator development server 808 via Internet 822. Upon connection to operator development server 808, emulator 101 may download characteristic data 815 from operator development server 808 for one or more mobile device types supported by operator development server 808 (i.e., supported by the operator's wireless network). Characteristic data 815 may, for example, represent mobile device characteristics 115 of FIG. 1. Further, emulator 101 may download additional model data 820 for use within device model 102 for increasing simulated functionality of model 102 (e.g., simulating additional handset functionality and/or network functionality). The user of emulator 101 may, for example, purchase data 820 for additional mobile device types as they become available, thereby allowing emulator 101 to include modeling capability for a new pre-release mobile device, scheduled release mobile device and current mobile devices. Alternatively, the use of data 815 and data 820 may be includes within a monthly subscription fee, thereby allowing the user to author applications for new mobile devices (e.g., new mobile phone models and live mobile profiles) provided by an operator (e.g., mobile phone wireless network operator).

In one example of operation, emulator 101 downloads a network simulator interface 804 from operator development server 808 into device model 102 as shown in FIG. 8. Network simulator interface 804 includes functionality that allows device model 102 to communicate with simulator 810 to simulate connectivity of mobile device 114 with a wireless network. Specifically, network simulator interface 804 within model 102 interacts with data provider 812 and event generator 814 to determine resource utilization resulting from network interaction by model 102. Thus, as application 104 plays within model 102, the effects of device 114 interacting with a wireless network are simulated such that frame based profile data display 110 shows resource utilization that includes the live or scripted effects of interaction with the wireless network. In one embodiment, capacity line 308 of display 300 within profile data display 110 is dynamically modified to show actual resource availability to application 104 resulting from resource utilization by simulated wireless network activity within device model 102. For example, if a message is received and/or retrieved by model 102 while playing application 104, certain resources are required to handle the received message, and therefore available resources for application 104 is reduced accordingly.

Simulator 810 is shown with a data provider 812 and an event generator 814. Data provider 812 may, for example, simulate data transfers within a wireless network. For example, the data transfer may be cased upon a certain bandwidth associated with the wireless network. Event generator 814 may, for example, generate certain events (e.g., incoming calls, incoming text messages, etc) that occur within a wireless network. Simulator 810, using data provider 812 and event generator 814, thus interacts with network simulator interface 804 to model operation of a wireless network (e.g., a mobile phone network).

Operator interface 802 may interact with multiple operator development servers 808 to facilitate testing of application 104 with many operators' networks. As appreciated, where application 104 is designed to function on multiple mobile devices operating on wireless networks worldwide, operator network simulation removes the burden of traveling to operator network locations from application developers, since application operation on a mobile device connected to a network may be simulated by emulator 101 and thus measured back against the authoring environment.

FIG. 9 shows one exemplary window 900 for selecting operator networks based upon geographic location. Window 900 shows a menu item 902 that, upon selection by the user, displays a world map 904 that allows the user to select a geographical region in which mobile device 114 is to operate. For example, window 900 shows a mouse pointer 906 selecting the United Kingdom, resulting in a sub-map display 908 of the selected location showing available wireless networks 910. Sub-map display 908 is, for example a 'mouse-over' event. Upon selection of the location, world map 904 is replaced by sub-map 908 of the selected location and a pull-down list 1004 of available operators within that location as shown in window 1000, FIG. 10. Alternatively, the use may select menu item 1002 to display pull-down list 1004.

Upon selection of an operator within list 1004, emulator 101 displays a pull-down list 1104 of mobile devices supported by the selected operator, as shown in window 1100 of FIG. 11. Alternatively, the use may select the menu item 1102 to display list 1104. Upon selection of a mobile device from list 1104, window 1200, FIG. 12, is displayed to allow the user to select desired network characteristics for simulation.

Window 1200 shows a pull-down list 1202 of network characteristics that may be simulated by simulator 810. For example, simulator 810 may allow control of scripted events (e.g., cell tower identification, service message, bandwidth, etc.), consumer events (e.g., checking email, checking messages, browsing network, available minutes, selecting images, etc.) and incoming events (e.g., phone calls, WAP Messages, receiving MMS, receiving SMS, etc.). Based upon selection from list 1202, a second list may be presented to allow further simulation requirements to be entered. In the example of window 1200, consumer events entry of list 1202 was selected, resulting in display of pull-down list 1204 from which check messages was selected resulting in the display of pull-down list 1206. In this example, the user may select 'send message' from list 1206 to evaluate the performance of application 104 while a message is received from the network.

In one embodiment, maps 904, 908 and lists 1004, 1104, 1202, 1204 and 1206 are based upon information received by operator interface 802 from one or more operator development servers 808. Thus, functionality of model 102 and selectable simulations of simulator 810 may be easily updated by the operator as new mobile devices are created without requiring updates to software of emulator 101.

Optionally, the user may select menu item 901, FIG. 9, to immediately locate, download and import modeling characteristics into emulator 101. These characteristics may be stored within storage 134 of computer 130, FIG. 1B.

FIG. 13 is a flowchart illustrating one exemplary method 1300 for configuring wireless network simulation.

In step 1302, method 1300 selects a geographic location of the wireless network. In one example of step 1302, emulator 101 displays window 900 and the user selects the United Kingdom as the wireless network location.

In step 1304, method 1300 selects a network operator from within the selected location. In one example of step 1304, emulator 101 displays window 1000 including pull-down list 1004 of network operators within the location selected in step 1302.

In step 1306, method 1300 connects to the selected network operator's development server. In one example of step 1306, emulator 101 utilizes operator interface 802 to connect to operator development server 808 based upon the operator selected in step 1304.

In step 1308, method 1300 downloads a list of mobile devices supported by the simulator of the operator selected in step 1304. In one example of step 1308, emulator 101 downloads characteristic data 815 from server 808 to determine mobile devices supported by simulator 810 and populates list 1104 of window 1100. Of note, an operator may add functionality to simulator 810 based upon a new mobile device prior to supporting the device within the operator's wireless network, thereby encouraging development of applications for the new device before its launch, increasing operator and/or author revenues.

In step 1310, method 1300 selects a mobile device from the list of supported mobile devices. In one example of step 1310, the user selects a mobile device for emulation from list 1104 of window 1100. In another example, where the user has already selected a mobile device from pull-down list 502, emulator 101 automatically selects the same device, if available, from list 1104.

In step 1312, method 1300 downloads a network simulator interface for the selected mobile device. In one example of step 1312, emulator 101 instructs operator interface 802 to download network simulator interface 804 from server 808.

In step 1314, method 1300 loads the network simulator interface into the mobile device model. In one example if step 1314, emulator 101 loads network simulator interface 804 into model 102.

In step 1316, method 1300 selects network characteristics to simulate. In one example of step 1316, the user utilizes lists 1202, 1204 and 1206 of window 1200 to specify network characteristics for simulation by simulator 810.

In step 1318, method 1300 models the application running within a mobile device connected to a wireless network. In one example of step 1318, model 102 interacts with simulator 110 via network simulator interface 804 and internet 822 while playing application 104 and displaying profile data display 110.

In one embodiment, the user may purchase and download simulator 810 from operator development server 808 to facilitate local simulation of the wireless network (i.e., without utilizing Internet 822). In this embodiment, simulator 810 may operate within emulator 101, within authoring environment 122 or within computer 130 to provide interaction with model 102.

Emulator 101 may utilize operator interface 802 to interact with one or more operator development servers 808 to download characteristics (e.g., characteristic data 815) and modeling data (e.g., model data 820) for generating mobile device model 102. As new mobile devices are made available, each application author (i.e., user) is able to download these modeling characteristics and test applications for the new mobile device. As mobile devices become more sophisticated and include additional hardware and functionality, emulator 101, though a subscription service with an operator, for example, may download this additional functionality for use in model 102. These characteristics (e.g., characteristic data 815) may include bitmaps, characteristics handset profiles, modeling algorithms, complete mobile device models, bandwidths etc. thereby automatically updating functionality of authoring environment 122. Wireless network operators participate by updating their development servers (e.g., development servers 808) to provide the latest emulation information and functionality for each supported mobile device (e.g., mobile phone handset) and by updating their network simulators (e.g., simulator 810) to includes functionality and/or proposed functionality of their wireless networks.

Application authors (e.g., users of emulator 101) are provided with a visual authoring environment in which the authored application may be emulated as operating within one or more modeled mobile devices (that are optionally connected to a simulated wireless network) without leaving the authoring environment.

The emulator (e.g., emulator 101) may be provided as part of the authoring environment, or as an add-on to an existing development tool. In an embodiment, characteristics for each mobile device to be emulated are downloaded from a server for a determined price or subscription fee. Since new mobile devices are continually being produced, application authors continually require new modeling characteristics to be able to test their applications. For example, a subscribed charge of $10-15 dollars per handset saves each developer from purchasing a mobile device ($100-200 dollars) and alleviates the need to travel to a wireless network location when testing each mobile device. Thus, the wireless network operator may receive revenue from developers by providing the developers with online network simulation capability. The application authors, via the Internet, are then able to test applications for mobile devices running on wireless networks worldwide.

Characteristics for each mobile device to be emulated may be downloaded from a server for a determined price, licensing or subscription fee. It is estimated that nearly 700 million new mobile devices will be shipped in 2005, with a new handset model being launched every other day. This rapid mobile device development requires that applications designed to run on these mobile devices also sustain rapid development. Development systems targeted at one mobile device may become obsolete and possibly of little value to the developer at the time it is shipped. Since a new mobile device is being launched every other day, application authors continually require purchasing all addressable targeted devices prior to consumer release. For example, a charge of $10-15 dollars per modeled handset would save each developer purchasing each target mobile device ($100-200 dollars) as well as alleviating the need to travel to a wireless network location whilst testing each mobile device before public release, two substantial development and release costs.

During development of an application for a mobile device, an application author may transfer and play the application hundreds of times (development life cycles) on the targeted mobile device before identifying and correcting all system resource problems within the application. Live server and profile updates would substantially reduce and alleviate a high churn rate of development life cycles, enabling a more cost effective authoring model for the developer. As well, although the purchase of a 'static' PC authoring environment may become obsolete due to the ongoing release of new mobile handsets (the target release platform) emulator 101 and operator development server 808 maintains a live and continually updatable business model and authoring platform long after the initial authoring platform has released to the market.

FIG. 14 is a flowchart illustrating one method for determining whether an application of a mobile device is operable. In step 1402, method 1400 downloads characteristics over Internet for one or more mobile devices to be emulated. In step 1404, method 1400 tests the application for the mobile devices, via the Internet, using an emulator to determine if the application is operable on the mobile device.

Changes may be made in the above methods and systems without departing from the scope hereof. It should thus be

US 8,332,203 B1 noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A system for developing an application to execute on a mobile device comprising:
   a software authoring interface configured to simultaneously visually emulate, via one or more profile display windows, a plurality of hardware characteristics indicative of performance of the mobile device when executing the application; and
   a system information window configured to display mobile device hardware characteristics.

2. The system of claim 1, wherein the relative positions of maximum and minimum operational thresholds of the application are displayed in real time while the application is executing.

3. The system of claim 1, wherein the maximum and minimum operational thresholds are adjustable by a system user.

4. The system of claim 1, wherein the frame executed by the application is displayed for each of the thresholds.

5. The system of claim 1, wherein each of the windows can be docked and undocked to simultaneously display one or more of the windows.

6. The system of claim 1, further including a module configured to allow user control of at least one of the hardware characteristics via an image of the mobile device.

7. The system of claim 1, wherein the windows can be scrolled to display the contents thereof at any given position of the executing application.

8. The system of claim 1, wherein movement of a respective scroll bar enables display of a static runtime position of each of a plurality of said profile windows displaying said characteristics of the mobile device.

9. The system of claim 1, wherein the percentage CPU and memory usage of the mobile device is indicated in one of the profile windows when executing the application.

10. The system of claim 1, wherein the software authoring interface is included in an authoring environment, and wherein the authoring environment is further configured to publish the application after verification that the application does not exceed resources of the mobile device.

11. The system of claim 10, wherein the authoring environment is further configured to publish the application using an interface providing communication with the mobile device.

12. The system of claim 11, wherein the interface includes Ethernet, WiFi, Bluetooth, infrared, or combinations thereof.

13. The system of claim 1, wherein the software authoring interface is included in an authoring environment, and wherein the system further comprises a further interface configured to communicate with a server, and wherein the authoring environment is configured to allow authoring of the application based on information received from the server.

14. The system of claim 1, wherein the software authoring interface is included in an authoring environment, and wherein the system further comprises a further interface configured to communicate with a server to update the software authoring interface.

15. The system of claim 14, wherein the further interface is further configured to allow control by the server of events which impact performance of the application.

16. The system of claim 14, wherein the further interface is configured to communicate with the server in response to a user paying a subscription fee.

17. The system of claim 16, wherein the software authoring interface is configured to allow authoring of applications using data received from the server responsive to the user paying the subscription fee.

18. The system of claim 17, wherein the software authoring interface is further configured to publish the application authored using the data received from the server responsive to the user paying the subscription fee.

19. The system of claim 1, wherein the software authoring interface is further configured to simultaneously visually emulate, via one or more profile display windows, a plurality of hardware characteristics indicative of performance of another mobile device when executing the application.

20. The system of claim 1, further comprising an emulator configured to test the application, via the Internet, to determine if the application is operable on the mobile device.

21. The system of claim 1, wherein the one or more profile display windows are configured to display resource utilization information graphically using a timeline indicating points in time during execution of the application.

22. A method for emulating an application executing in real time in a mobile device, the method comprising:
   emulating the mobile device in real time using a model running on a processor extrinsic to the mobile device, wherein the model is based on characteristics indicative of performance of the mobile device; executing the application in real time within the model;
   monitoring the application executing in the model to determine resource utilization information by the application for the mobile device; and displaying the resource utilization information for the mobile device.

23. The method of claim 22, wherein the step of displaying comprises displaying the resource utilization information graphically using a timeline indicating points in time during the execution of the application.

24. The method of claim 22, wherein step of emulating comprises: determining, based upon the characteristics, for the mobile device: the display size of the mobile device;
   the amount of random access memory (RAM);
   the amount of non-volatile memory; and
   the processor speed; and
   generating the model based upon one or more of the display size, the amount of RAM, the amount of non-volatile memory, and the processor type.

25. The method of claim 22, further comprising identifying one or more time points in the application where resource utilization of the application exceeds a maximum resource availability threshold of any one of the mobile devices.

26. The method of claim 25, further comprising displaying the first identified time point in the application to indicate a crash of the application on the emulated mobile device.

27. The method of claim 22, further comprising identifying one or more time points in the application where resource utilization of the application exceeds a maximum resource availability threshold of the mobile device, wherein the threshold defaults to a maximum resource availability for the emulated mobile device.

28. The method of claim 22, further comprising identifying one or more time points in the application where resource utilization of the application exceeds a maximum resource availability threshold of any one of the mobile devices, wherein the threshold is modified to dynamically adjust resource availability to the application.

29. The method of claim 22, wherein the resource utilization information is displayed relative to execution of a numbered frame.

30. A method for emulating an application executing on a mobile device comprising:
- emulating the mobile device using a model based upon performance characteristics of the mobile device;
- executing the application in real time within the model;
- monitoring the model to determine resource utilization of the application executing on the mobile device; and
- displaying the resource utilization information.

31. A method for emulating an application executing on a mobile device, the method comprising:
- emulating, on a processor extrinsic to the mobile device, the mobile device as a model based upon characteristics indicative of performance of the mobile device;
- executing the application in real time within the model;
- monitoring the application executing in the model to determine utilization of the mobile device's resources by the application;
- identifying a time point in the application where resource utilization by the application exceeds a maximum resource availability threshold of the mobile device; and
- displaying the identified time point to indicate a crash of the application on the emulated mobile device.

32. The method of claim 31, wherein the time point is displayed in terms of a numbered frame of the application.

33. A method for developing an application to execute on a mobile device, the method comprising:
- determining resource utilization of the application when executed on the mobile device by:
- emulating the mobile device on a processor extrinsic to the mobile device using a model based on characteristics indicative of performance of the mobile device;
- loading the application into the model; and
- monitoring the application executing in real time within the model to determine resource utilization of the application for the mobile device; and
- repeating the steps of receiving and determining until the resource utilization when running the application is no greater than resource availability of the mobile device.

* * * * *